(12) United States Patent
Formisano

(10) Patent No.: US 7,389,255 B2
(45) Date of Patent: Jun. 17, 2008

(54) DYNAMIC RESIDENTIAL CONSTRUCTION COST ESTIMATION PROCESS

(76) Inventor: Robert Formisano, 70 Cambridge Rd., Grosse Pointe Farms, MI (US) 48236

( * ) Notice: Subject to any disclaimer, the term of this patent is extended or adjusted under 35 U.S.C. 154(b) by 329 days.

(21) Appl. No.: 10/721,921

(22) Filed: Nov. 25, 2003

(65) Prior Publication Data

US 2005/0108982 A1  May 26, 2005

(51) Int. Cl.
 *G06Q 30/00* (2006.01)
(52) U.S. Cl. ............................................. 705/26; 705/1
(58) Field of Classification Search ................. 705/26, 705/27
 See application file for complete search history.

(56) References Cited

U.S. PATENT DOCUMENTS

| | | | | |
|---|---|---|---|---|
| 5,189,606 | A * | 2/1993 | Burns et al. ................... | 705/10 |
| 5,546,564 | A | 8/1996 | Horie | |
| 6,446,053 | B1 * | 9/2002 | Elliott ........................ | 705/400 |
| 6,859,768 | B1 * | 2/2005 | Wakelam et al. .............. | 703/1 |
| 7,006,977 | B1 * | 2/2006 | Attra et al. ..................... | 705/1 |
| 2001/0037273 | A1 | 11/2001 | Greenlee, Jr. | |
| 2002/0026343 | A1 * | 2/2002 | Duenke ......................... | 705/8 |
| 2003/0115163 | A1 * | 6/2003 | Moore et al. ................ | 705/500 |
| 2005/0261930 | A1 * | 11/2005 | Litz ............................... | 705/1 |

OTHER PUBLICATIONS

Edwin McDowell, Construction Industry Quickly Building A Digital Future, Nov. 25, 2000, The Plain Dealer.*
Improved Design Decision-Making Using Small Group Value Engineering Gaming/Simulation by Stephen Jarome Kirk, 1992.

* cited by examiner

*Primary Examiner*—Jeffrey A. Smith
*Assistant Examiner*—Jason B. Dunham
(74) *Attorney, Agent, or Firm*—Gifford, Krass, Sprinkle, Anderson & Citkowski, P.C.

(57) ABSTRACT

A residential construction estimation process that includes the steps of: inputting conceptual level data, selecting design characteristics, calculating a virtual geometry, selecting assemblies of construction components based on the calculated virtual geometry, selecting component options based on the selected assemblies of construction components, identifying a cost of each of the selected component options, and calculating a cost of the residence, wherein the cost is dynamically linked to each of the selected and inputted information of the preceding steps, such that the cost of the residence can be dynamically modeled at a detailed component level.

30 Claims, 12 Drawing Sheets

UNIT PRICE CATALOG
1014 Catalog Entries
© 2002 Project Planning & Management, Inc.

Location Factor:
Sales Tax:
Ave Sub Gen'l Conditions:

| System | Description | Base Unit Cost |
|---|---|---|
| col_sprd_ftg | 3000 PSI concrete | |
| 1 | forms, rebar, concr, placing, finish | $291.00 |
| sprd_ftg | 3000 PSI concrete | |
| 1 | Not Req'd (Trench Footing) | $0.00 |
| 2 | 12" thick x 18" wide; forms, reinf, direct chute | $10.76 |
| 3 | 12" thick x 24" wide; forms, reinf, direct chute | $16.04 |
| 4 | (For Precast Foundations) 12" thick x 24" wide; 3/4" stone bedding | $2.22 |
| fdn_drain | | |
| 1 | PVC 4" dia; gravel drain bed | $4.00 |
| 2 | PVC 6" dia; gravel drain bed | $5.00 |
| fdn_wall | 4' high foundation: | |
| 1 | Poured-8"; bitum/damp; sill plates | $25.60 |
| 2 | Poured-10"; bitum/damp; sill plates | $28.26 |
| 3 | Poured-10"; brickledge; bitum/damp; sill plates | $32.04 |
| 4 | Poured-12"; bitum/damp; sill plates | $32.60 |
| 5 | Poured-12"; brickledge; bitum/damp; sill plates | $36.38 |
| 6 | Block-8"; grouted; bitum/damp; parging; sill plates | $42.68 |
| 7 | Block-10"; grouted; bitum/damp; parging; sill plates | $50.44 |
| 8 | Block-12"; grouted; parging; bitum/damp; sill plates | $58.20 |
| 9 | Pre-Cast Wall System; 1" Rigid Insul (R-5), furring ribs; sill plates | $40.63 |

FIGURE 2a 0.93    MASTER [BASELINE] Resi-Cost™
6.00%   Berrien City, MI
0%                                Cost Adjustments

| Adjusted Unit Cost | Unit | Loc Fctr | S_Tax | Sub | GC |
|---|---|---|---|---|---|
| $278.75 | CY | 0.93 | 3.00% | 0% | |
| $0.00 | LF | | | | |
| $10.31 | LF | 0.93 | 3.00% | 0% | |
| $15.36 | LF | 0.93 | 3.00% | 0% | |
| $2.13 | LF | 0.93 | 3.00% | 0% | |
| $3.83 | LF | 0.93 | 3.00% | 0% | |
| $4.79 | LF | 0.93 | 3.00% | 0% | |
| $24.52 | LF | 0.93 | 3.00% | 0% | |
| $27.07 | LF | 0.93 | 3.00% | 0% | |
| $30.69 | LF | 0.93 | 3.00% | 0% | |
| $31.23 | LF | 0.93 | 3.00% | 0% | |
| $34.85 | LF | 0.93 | 3.00% | 0% | |
| $40.88 | LF | 0.93 | 3.00% | 0% | |
| $48.32 | LF | 0.93 | 3.00% | 0% | |
| $55.75 | LF | 0.93 | 3.00% | 0% | |
| $38.91 | LF | 0.93 | 3.00% | 0% | |

FIGURE 2b

03 Superstructure

031 Floor Construction

NOTE: *Priced from least to most expensive per SF of floor system (left to right)*

- [1] Composition "I" Joists *(Standard spans to 24')* *1" x 3" Ceiling furring not required*  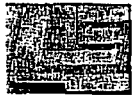
- [2] Dimension lumber (e.g. 2x12) *(Standard spans to 19')* * Material readily available
- [3] Truss Joists *(Standard spans to 24')* * Utilities easily pass through  

032 Roof Construction

- House: [ ] SIP / Timber Frame  [ ] Prefab trusses  [ ] Dimensional lumber (e.g. 2x10)
- Garage: [ ] SIP / Glu Lam Ridge Beam  [ ] Prefab trusses  [ ] Dimensional lumber (e.g. 2x10)
- Dormers: [ ] SIP  [ ] Dimensional lumber (e.g. 2x8)
- SIP Thickness: [ ] SIP Not Used  [ ] 8.25" OSB/OSB (R-34)  [ ] 10.25" OSB/OSB (R-42)
  [ ] 4.5" OSB/OSB (R-18)  [ ] 6.5" OSB/OSB (R-27)  [ ] 12.25" OSB/OSB (R-45)
- SIP Interior Finish: [ ] 1/2" Gypsum Board  [ ] Tongue & Groove "T&G" (pine or cedar)

033 Stair Construction

- Basement Stair: [ ] Basement stairs, open riser  [ ] Pine treads/risers, box stairs, balusters/handrail, newel post
  [ ] Pine treads/risers, box stairs, WALLS 2 SIDES/handrail only
  [ ] Pine treads/risers, box stairs, balusters/handrail, newel post
- Ground Floor Stair: [ ] Pine treads / risers (pine), box stairs, balusters/handrail, newel post
  [ ] Hardwood treads / risers, box stairs, WALLS 2 SIDES, balusters/handrail, newel post
  [ ] Hardwood treads / risers, box stairs, balusters/handrail, newel post
  [ ] Curved stairway (hardwood), open 1 side  [ ] Curved stairway (hardwood), open 2 sides
- Auxiliary Stair: [ ] None  [ ] Attic stair; folding; pine; 8'-6"
  [ ] Pine treads / risers (pine), box stairs, handrail, newel post  [ ] Spiral stairs, oak
  [ ] Hardwood treads / risers, box stairs, handrail, newel post  [ ] Spiral stairs, metal FIGURE 3b

| ZIP CODE | CITY | STATE | Regional Adjustment Factor | Winter Design Temp | |
|---|---|---|---|---|---|
| | | | | 99% | 97.5% |
| 35000 | Cullman | AL | 0.85 | 17 | 21 |
| 35200 | Birmingham | AL | 0.86 | 17 | 21 |

FIGURE 4a

| Deg Days | Deg Days | Sales Tax | Sub GC | Escalation |
|---|---|---|---|---|
| Heating DD | Cooling DD | Tax Rate | 2% | 1.50% |
| 2,823 | 1,881 | 4% | | |
| 2,823 | 1,881 | 4% | | |

FIGURE 4b

ENERGY MODEL

TOTAL FINISHED AREA (TFA): 2,400 SF
TOTAL CONSTRUCTED AREA: 4,764 SF

MASTER [BASELINE] Resi-Cost™
Berrien City, MI
3 Bedroom; 1 Full; 1 Half Baths

Resi-Cost Managed

| Enter: | State | Residential Energy Code | State Mandate | Comments |
|---|---|---|---|---|
| MI | Michigan | Michigan Uniform Energy Code Part 10 Rules, less stringent than 1992 MEC | Yes | Prior to June 22, 1977, the state of Michigan had no building energy efficiency requirements. On July 27, 1985, the state adopted ANSI/ASHRAE/IES Standard 90A-1980 statewide. SB 719, signed in early January 1996, repealed the 1995 adoption of the 1993 MEC. The legislation directed the state construction code commission to, by April 1, 1997, provide cost-effective standards and establish a program to provide home buyers with energy rating information. The Michigan Uniform Energy Code Part 10 Rules were adopted March 31, 1999. |

Envelope Heat Loss

| | Area (SF) | R-Value | U Factor | Delta T | Heat Loss (BTUH) |
|---|---|---|---|---|---|
| Heat Loss-Basement Walls-ENERGY STAR | 1,479 | 15 | 0.07 | 22 | 2,169 |
| Heat Loss-Basement Floor (or Ground Flr Slab) | 1,500 | 25 | 0.04 | 22 | 1,320 |
| Heat Loss-Walkout Wall | 0 | 0 | 0.00 | 67 | - |
| Heat Loss-Walls | 1,751 | 10 | 0.10 | 67 | 11,970 |
| Heat Loss-Walls (Supplemental) | 0 | 0 | 0.00 | 67 | - |
| Heat Loss-Windows (low-E) Default (R-3) | 345 | 3 | 0.33 | 67 | 7,705 |
| Heat Loss-Windows Standard Glazing (R-2) | 0 | 2 | 0.50 | 67 | - |
| Heat Loss-Windows (low-E) Triple Glaze (R-6) | 0 | 6 | 0.17 | 67 | - |
| Heat Loss-Doorwalls | 0 | 3 | 0.33 | 67 | - |
| Heat Loss-Doorwalls | 0 | 3 | 0.33 | 67 | - |
| Heat Loss-Doors | 63 | 5 | 0.20 | 67 | 844 |
| Heat Loss-Roof SIP (on Timber) | 0 | 0 | 0.00 | 67 | - |
| Heat Loss-Roof SIP (on SIP) | 0 | 0 | 0.00 | 67 | - |
| Heat Loss-Attic (Uninsulated Roof Rafters) | 1,500 | 22 | 0.05 | 67 | 4,653 |
| Heat Loss-Skylights | 0 | 3 | 0.33 | 67 | - |
| | | | | Building Envelope Heat Loss | 28,661 BTUH |

FIGURE 5a

| | |
|---|---|
| 5 | ASHRAE 99% Design Dry Bulb Temp (deg F) |
| 72 | Indoor Design Temp (deg F) |
| 67 | Delta T |

| | |
|---|---|
| 68,097 | Total BTUH Demand |
| 1.4 | Furnace Sizing Factor |
| 120,000 | Furnace Size at 80% |
| | Meets Energy Star: |
| 106,000 | Furnace Size at 90% |
| 102,000 | Furnace Size at 94% |
| 96,000 | Furnace Size at 100% (ELECTRIC) |

FIGURE 5b

| Envelope Tightness | | | | | | | |
|---|---|---|---|---|---|---|---|
| Select > | 2 | Tight Stick Built | 1.00 | ACH (Air Changes / Hour) | | Design Occupancy: | 4 |
| Infiltration / Ventilation | | | CFM | ACH | Constant | Volume | Delta T | Heat Loss (BTUH) |
| Natural Infiltration | | | 545 | 1.00 | 1.00 | 32,700 | 67 | 39,436 |
| Mechanical Ventilation w/AAUX | | | 0 | 1.00 | 1.00 | 32,700 | 18 | |
| 75% AAUX Efficiency | | | 108 | Min Target CFM | | | | |

Envelope + Infiltration Heat Loss = 68,097 BTUH
Furnace AFUE = 94%  3  <Select Furnace Efficiency D = Degree Days = 6,235  Berrien City, MI   < (per US Weather Service)
T = Temp diff = 67  degrees
V = Fuel value = 1,052  BTUh per cu ft natural gas
V = Fuel value = 91,743  BTUh per Gallon propane
V = Fuel value = 3,413  BTUh per KWH electric
CF1 = 1.36  Correction factor that includes the effects of rated full load efficiency,
            part load performance, over sizing and energy conservation devices.
CF2 = 0.71  Empirical correction factor for heating effect
            versus 65 degrees F degrees-days.

E = Annual Energy Consumption = 148,509 cu ft natural gas
                                  1,703 gallons of propane
                                        KWH of electricity (100% Eff)

Annual Heating Cost = $1,351.43  NGAS
Annual Heating Cost = $2,656.57  PROPANE
Annual Heating Cost =     $0.00  ELECTRIC FIGURE 5c HOME SPECIFIC QUALITY / COST SELECTIONS  
SUBSYSTEMS AND CONSTRUCTION ASSEMBLY OPTIONS  
© 2002 Home-Cost.com  261 System Selections MASTER [BASELINE] Resi-Cost™  
TOTAL FINISHED AREA: 2,400 SF  Berrien City, MI  
TOTAL CONSTRUCTED AREA: 4,764 SF  3 Bedroom; 1 Full; 1 Half Baths Resi-Cost™ Managed

| SYSTEM | SUBSYSTEM | Selection | CONSTRUCTION ASSEMBLY OPTIONS | quan | unit | unit $ | total $ | BASELINE TOTAL | Savings |
|---|---|---|---|---|---|---|---|---|---|
| 01 Foundation | 011 Standard Foundations | | | | | | | | |
| | 011.10 Spread footings (timber columns) | 1 | Not Used | 0 | NCOLS | $64.53 | $0 | $0 | $0 |
| | 011.10 Spread footings (lally columns) | 2 | 12" thick-36"x36"; forms, rebar, concrete | 4 | EA | $92.92 | $372 | $372 | $0 |
| | 011.20 Spread footings (foundation walls) | 4 | 12" thick x 24" wide; forms, reinf, direct chute | 108 | LF | $15.36 | $1,659 | $1,659 | $0 |
| | 011.20 Spread footings (basement walls) | 5 | 12" thick x 24" wide; forms, reinf, direct chute, PVC 6" gravel drainbed | 164 | LF | $20.15 | $3,312 | $3,312 | $0 |
| | 011.30 Foundation Wall (4' high) | 2 | Poured-10'; bitum/damp; sill plates | 150 | LF | $27.07 | $4,061 | $4,061 | $0 |
| | 011.40 Excavation: Foundation Wall Footing | 2 | 4' depth spread ftg excav, sand/gravel, backfill | 864 | SF | $0.56 | $483 | $483 | $0 |
| | 012 Special Foundations | 1 | No additional special foundations | 2,364 | SF | $0.00 | $0 | $0 | $0 |
| 02 Substructure | 021 Slab on Grade | | | | | | | | |
| | 021.00 Ground Floor Slab on Grade | 3 | Not Used | 0 | SF | $0.00 | $0 | $0 | $0 |
| | 021.00 Garage Floor Slab on Grade | 2 | 5" slab w/4" gravel base; 6 mil vap; expan mat'l; W1.4/W1.4; steel trowel | 864 | SF | $3.11 | $2,690 | $2,690 | $0 |
| | 021.00 Basement Slab on Grade | 3 | 4" slab w/4" gravel base; 6 mil vap; expan mat'l; W1.4/W1.4; steel trowel | 1,500 | SF | $2.82 | $4,224 | $4,224 | $0 |
| | 021.00 Crawlspace Floor | 1 | Not Used | 0 | SF | $0.00 | $0 | $0 | $0 |
| | 021.10 Ground Floor Slab Insulation | 1 | Not Used | 0 | SF | $0.00 | $0 | $0 | $0 |
| | 021.10 Basement Slab Insulation | 1 | Not Used | 0 | SF | $0.00 | $0 | $0 | $0 |
| | 022 Excavation: Basement / Crawl | 3 | Walkout Sand & gravel excav, backfill; compaction 8" lifts; rough grade | 500 | CY | $6.11 | $3,057 | $3,057 | $0 |
| | 022.00 Off Site Trucking | 1 | Assumes off-site hauling NOT required (Assumes on site placement of s | 0 | CY | $0.00 | $0 | $0 | $0 |
| | 023 Basement Walls | 2 | Poured-10'; bitum/damp; sill plates | 1,101 | BWA | $7.11 | $7,823 | $7,823 | $0 |
| | 023.00 Exposed Basement Wall Framing | 1 | Not Used | 0 | BWA | $0.00 | $0 | $0 | $0 |
| | 023.10 Basement Wall Insulation | 4 | 3" rigid-25 PSI Compressive (R-15) ENERGY STAR COMPLIANT | 1,101 | BWA | $1.39 | $1,528 | $1,528 | $0 |

FIGURE 6a

HOME SPECIFIC QUALITY / COST SELECTIONS  
SUBSYSTEMS AND CONSTRUCTION ASSEMBLY OPTIONS  
© 2002 Home-Cost.com  261 System Selections MASTER [BASELINE] Resi-Cost™  
Berrien City, MI  
3 Bedroom; 1 Full, 1 Half Baths

TOTAL FINISHED AREA: 2,400 SF  
TOTAL CONSTRUCTED AREA: 4,764 SF

Resi-Cost™ Managed

| SYSTEM | SUBSYSTEM | Selection | CONSTRUCTION ASSEMBLY OPTIONS | quan | unit | unit $ | total $ | BASELINE TOTAL | Savings |
|---|---|---|---|---|---|---|---|---|---|
| 01 Foundation | 011 Standard Foundations | | | | | | | | |
| | 01:10 Spread footings (timber columns) | 1 | Not Used | 0 | NCOLS | $64.53 | $0 | $0 | $0 |
| | 01:10 Spread footings (tally columns) | 2 | 12" thick–36"x36"; forms, rebar, concrete | 4 | EA | $92.92 | $372 | $372 | $0 |
| | 01:20 Spread footings (foundation walls) | 4 | 12" thick x 24" wide; forms, reinf, direct chute | 108 | LF | $15.36 | $1,659 | $1,659 | $0 |
| | 01:20 Spread footings (basement walls) | 5 | 12" thick x 24" wide; forms, reinf, direct chute, PVC 6" gravel drainbed | 164 | LF | $20.15 | $3,312 | $3,312 | $0 |
| | 01:30 Foundation Wall (4' high) | 2 | Poured-10"; bitum/damp; sill plates | 108 | LF | $27.07 | $2,924 | $4,061 | ($1,137) |
| | 01:40 Excavation: Foundation Wall Footing | 2 | 4' depth spread ftg excav, sand/gravel, backfill | 864 | SF | $0.56 | $483 | $483 | $0 |
| | 012 Special Foundations | 1 | No additional special foundations | 2,354 | SF | $0.00 | $0 | $0 | $0 |
| 02 Substructure | 021 Slab on Grade | | | | | | | | |
| | 021.00 Ground Floor Slab on Grade | 3 | Not Used | 0 | SF | $0.00 | $0 | $0 | $0 |
| | 021.00 Garage Floor Slab on Grade | 2 | 5" slab w/4" gravel base; 6 mil vap; expan mat'l; W1.4/W1.4; steel trowe | 864 | SF | $3.11 | $2,690 | $2,690 | $0 |
| | 021.00 Basement Slab on Grade | 3 | 4" slab w/4" gravel base; 6 mil vap; expan mat'l; W1.4/W1.4; steel trowe | 1,500 | SF | $2.82 | $4,224 | $4,224 | $0 |
| | 021.00 Crawlspace Floor | 1 | Not Used | 0 | SF | $0.00 | $0 | $0 | $0 |
| | 021:10 Ground Floor Slab Insulation | 1 | Not Used | 0 | SF | $0.00 | $0 | $0 | $0 |
| | 021:10 Basement Slab Insulation | 1 | Not Used | 0 | SF | $0.00 | $0 | $0 | $0 |
| | 022 Excavation: Basement / Crawl | 3 | <ERROR> Must Select '1' or '2-Full Basement Option | 500 | CY | <ERROR> | #VALUE! | $3,057 | #VALUE! |
| | 022.00 Off Site Trucking | 1 | Assumes off-site hauling NOT required (Assumes on site placement of s | 0 | CY | $0.00 | $0 | $0 | $0 |
| | 023 Basement Walls | 2 | Poured-10"; bitum/damp, sill plates | 1,479 | BWA | $7.11 | $10,509 | $7,823 | $2,686 |
| | 023.00 Exposed Basement Wall Framing | 1 | Not Used | 0 | BWA | $0.00 | $0 | $0 | $0 |
| | 023:10 Basement Wall Insulation | 4 | 3" rigid-25 PSI Compressive (R-15) ENERGY STAR COMPLIANT | 1,479 | BWA | $1.39 | $2,053 | $1,528 | $525 |

Alternate Selections illustrating self documenting line item changes to component costs and Self-Correcting feature (Line 022 Basement Excavation) wherein "ERROR" was triggered when "Walkout Basement" was deselected in '40' Design Characteristics, requiring selection of Full Basement excavation options.

FIGURE 6b

DYNAMIC RESIDENTIAL CONSTRUCTION COST ESTIMATION PROCESS

BACKGROUND OF THE INVENTION

1. Field of the Invention

This invention relates to a construction cost estimation process, and more particularly to a construction cost estimation process for residential construction.

2. Description of the Related Art

Cost estimation of construction projects for both residential and commercial construction is a necessary step in budgeting for, and constructing, a residential or commercial building. Current early stage cost estimation is at best an inexact science, providing a "ball-park" figure that often leads to erroneous assumptions and cost overruns on any given project.

In the commercial construction industry, efforts have been made to develop a uniform standard classification for various building elements known as UNIFORMAT originally developed by the American Institute of Architects and General Services Administration in 1972 for estimating and design cost analysis for commercial buildings. A second generation of the UNIFORMAT system known as UNIFORMAT II defines a standard classification for building elements and related site work and was released in 1993 by the American Society for Testing and Materials under ASTM standard E1557. The UNIFORMAT II standard utilizes elements that are traditionally defined as major construction system components, common to most buildings that perform a given function regardless of the design specification, construction method or materials used. The UNIFORMAT standard provides a common organizing framework linking the building program, specifications, and estimates for a commercial construction project. While the UNIFORMAT standard provides a structure for organizing building elements and construction costs in commercial construction projects, there exists no such standard for the organization of building component elemental classifications and construction costs in residential projects.

Typical construction estimating practices are organized into 3 methodologies. Their use is typically determined by where in the design development process the estimate is occurring; Early, Mid or Final stage. Early stage estimates are most commonly based on a "rule of thumb" average cost per square foot of finished construction area (Cost/SF). This process is highly inaccurate and is the most frequently and easily misapplied method of estimating. It does not model the cost for any specific project and it does not adequately factor the variables for costs of unfinished construction (areas without finish, such as garage and unfinished basement) or adequately factor the variables of different quality levels of construction. Furthermore, it is inherently unable to model costs uniquely relevant to any given project. Early stage estimates may also be based on a historical cost per square foot of finished construction area (Historical Cost/SF) for similar projects. Here costs are derived based on a database or factors of similar type projects but again result in poor accuracy as this methodology is also inherently unable to model costs uniquely relevant to a subject project. This process is also limited by the extent of a given historical database having a very close "historical project" to the subject project being estimated. If the subject project is different than the historical projects, this process is no better than the Cost/SF method.

Mid to Final design stage estimates are based on the traditional detailed Quantity Take-Off (QTO) and unit price estimate method. This process is extremely time consuming and tedious, yields a more accurate cost of a subject project than the previous two methods, but is only able to be performed with significantly complete blueprints and specifications. It requires completed detailed and scaled drawings, notes and specifications to allow the estimator to calculate areas, quantities and to determine quality levels. This method cannot be used for early stage estimates/budgets since the design must be significantly complete and drawn before the estimate can be performed. Any change to the design results in drawings having to be redone and the QTO estimate recalculated.

None of these common estimating practices are able to accurately estimate the costs of construction for a residential project at any point in the design development process (Early, Mid or Final stage), nor are they able to dynamically model the cost impacts of variations to size and quality levels of construction components such that a specific estimate for a unique residence may be derived.

The computer-based residential cost estimation process of the present invention allows the ability to vary the selections related to design decisions, components of construction, quality of construction components, size of the home, quantities of materials and other variables within dynamically linked logical arguments in the computer program, resulting in instant recalculation of quantities and cost. This feature provides the ability to model numerous design and construction quality options, and to determine the cost impact of those options, so that a consumer may determine the cost of a residence or define the design parameters of a residence to meet a predetermined budget.

This invention is unlike other current estimating technologies which are based on manual or Computer Aided Design (CAD) quantity take off methods (QTO) involving computer calculations of areas and quantities of materials derived from fully developed design documentations; or based on a database of "similar" type projects of limited similar attributes to a subject property. This invention provides the technology unlike any other to instantly model the cost of a specific residence to specific design criteria at any stage of design.

The cost estimating structure of this invention is based on a unique building component elemental classification structure emulating the UNIFORMAT elemental classifications standard for only the construction system and select subsystem titles, but include further functionally descriptive materials such as assemblies and subassemblies of construction that are unique to residential buildings. UNIFORMAT is a system for classifying building products and materials by functional system, (e.g., substructure, superstructure, exterior closure). Other estimating structures based on quantity take off methods (QTO) use the Construction Specifications Institute (CSI) 16 Division MasterFormat structure that is organized according to construction trade divisions based on construction products and materials. UNIFORMAT structure differs from trade bid structures because it is based on a building systems/subsystems classification structure instead of a product classification system (CSI MASTERFORMAT Divisions 1-16). Trades for multiple CSI Divisions may show up in a given UNIFORMAT system, (e.g., UNIFORMAT System 043-Exterior Doors includes labor, products and materials from multiple trade divisions such as door, hardware, door carpentry framing, exterior and interior trim casings, caulk, weather stripping and painting). The CSI MASTERFORMAT structure is reasonable for final stage QTO estimates based on fully developed and detailed architectural and engineering blueprints and specifications.

However, it is inadequate and inappropriate for early or mid stage estimating when drawings are incomplete and when economic comparisons of design alternatives are still being made. Significantly, it is in the early stages of design when reliable cost information on alternatives is most important yet is most difficult to achieve. The satisfaction of that need is one of the advantages of this invention. With the unique elemental classification structure of construction assemblies embodied in this invention, a user is provided the cost data usefully structured, and in real-time, so that economic analysis of design options may be understood.

This invention is a computer based construction estimating process and software, similar in function to a "rules based expert system", allowing analog and digital modes of data collection (e.g., paper or web based interface) and digital and physical user interface of data input (e.g., web based interface or physical input into computer). The present invention fills a significant real world need of providing a means for reliable residential cost estimates for a unique residence at any stage of the design or development process.

Advantages of the present invention include: 1) the ability to estimate costs at any stage of the design development process 2) not based on inaccurate "rules of thumb" estimating practices embodied in cost per square foot ($/SF) of finished construction but rather is based on total finished living area of the residence and the total constructed area of the residence which includes unfinished/non-living areas such as garage, unfinished basement 3) Not based on limiting "similar project databases" but rather on criteria specific to a particular house 4) Intelligent and dynamic allowing effects in cost from changes to any part of the design to be immediately understood and calculated 5) Reliable enough to be used as a cost breakdown for bank financing 6) Computer based construction estimating process is designed to work with an organized and similarly structured data collection tool (e.g., paper or web based interface) allowing consistent data collection to occur in a number of modes including: a) person to person b) remote completion of paper based data collection tool c) internet based completion of electronic data collection tool which directly inputs selections into model.

The Computer based construction estimating process provides functional descriptive output material of sufficient detail that it is used to define building specifications which are directly derived from project criteria and component options selected in development of the cost estimate, as well as the following advantages: 1) Robust ability to model "virtual geometry" of the residence driven by numerous combinations and options of residential home design elements comprising: House style (1 story; 1½ story, 2 story); Roof style (hip/gable) and use of secondary major gable ends; Varying roof pitch; Varying roof overhang; Use of dormers on house and garage; Use of chimney structure(s); Aspect ratio (length to width) of home; Use of covered porch; Use of screened porch; Structural system of home (dimensional framing versus post and beam) and ability to change structural system between major residential elements such as the main house, breezeway, garage; Establishment of individual ceiling heights for all floors of structure; Square foot areas of ground floor elements with areas of upper floor areas driven by the logical arguments of the formulas and prior selections or as modified input from the operator; Window areas; Use of 2 story open space when required; Inclusion or not of vaulted ceiling space for major residential elements of the main house, breezeway, garage; Basement usage including no basement, partial basement, full basement, crawl space and ability to model various basement conditions under major residential elements of the main house, breezeway, garage; Attached or detached garage options, connected or not connected by a breezeway; and Use of "shelled" spaces, i.e., constructed but unfinished areas (which will affect quantity and cost output later in the model).

The process also has the robust ability to model various materials of construction and construction assemblies for the residence and related site-work, through the use of expert system formulas and the ability to permanently include within the component options and cost database, new selections that may be required on a specific residence.

The process of the present invention uses "If-Then-Else" rules of the expert system formulas and are "self-correcting" in that they contain the logical arguments necessary to prevent faulty inputs and selections from being made, alerting the user to unacceptable or non-normal selections. The process also includes "If-Then-Else" rules of the expert system formulas that are "self-directing" in that they contain the logical arguments necessary to enable or preclude other pre-written options from being selected.

Building component elemental classifications are unique and improved over prior technology in that they are based on UNIFORMAT for only the construction system and select subsystem titles but create functionally descriptive material including: New assemblies and subassemblies of construction unique to residential buildings; Cost summary that relates to a standard breakout of costs for the immediate residence and for ancillary residential project costs including site-work and equipment costs. The process has the ability to dynamically model building costs of specially finished spaces at a detailed room by room level providing significant functionality to the model to vary finish materials and sizes of specially finished spaces, thereby providing a more accurate determination of construction costs. The process also has the ability to model geometry, structural systems, various materials of construction and construction assemblies for the residence and related site-work through the use of dynamic expert system formulas that make unnecessary the requirement for generic "Special Construction" categories which require manual input of values as in other estimating systems.

Other advantages of the present invention include: 1) Provisions for user overrides of computer generated quantity default values; 2) The ability to model alternative building selections and resulting costs from a baseline set of selections and resulting costs (required to allow "what-if" option evaluations) and have the computer instantly self document the line item cost impacts of specific changes as they are being made in the alternate mode; 3) Extensive functionally descriptive material database of unit prices used in the calculation of costs include consideration of, and ability to change important factors within the unit price calculations, such as sales tax and subcontractor general conditions; 4) Extensive functionally descriptive material database of unit prices used in the calculation of costs allow the ability to modify sales tax, subcontractor general conditions and geographic location factors (reflecting local market conditions) at a line item level within the unit price database; 5) Extensive functionally descriptive material database of unit prices for components are not comprised of static numbers but are dynamically linked to further supporting functionally descriptive databases of components including subassemblies of the component and costs of the subassembly including labor and material, resulting in the ability to adjust or document the component's unit price; and General Contractor's "General Conditions, Overhead and Profit" are dynamic options and provide ability to model variations to the General Conditions, Overhead and Profit components of the Contractor's cost.

There is therefore a need for a residential cost estimate process that can accurately and dynamically model a plurality of design and construction quality options at any stage during the design development process to determine the cost impact of those options, such that a consumer may determine the cost of the residential structure unique to their specific requirements and be able to define, model and change the home's various design characteristics, components and quality levels of those components to meet a predetermined target budget.

SUMMARY OF THE INVENTION

A residential cost estimation process that can accurately and dynamically model a plurality of design and construction quality options at any stage during the design development process to determine the cost impact of those options, such that a user may determine the cost of a residential structure unique to a specific set of requirements and be able to define, model and change the various home design characteristics, components and quality levels of those components to meet a predetermined target budget. Such residential construction estimation process includes the following steps: inputting project criteria, selecting design characteristics, calculating a virtual geometry, selecting assemblies of construction based on the calculated virtual geometry, selecting component options based on the selected assemblies of construction identifying a regionally adjusted cost of each of the selected component options, and calculating a construction cost of the residence, wherein the cost is dynamically linked to each of the selected and inputted information of the preceding steps, such that the cost of the residence is dynamically and specifically modeled at a detailed level for a unique project.

BRIEF DESCRIPTION OF THE DRAWINGS

FIGS. 2*a-b* are a sample portion of Component Cost Database '10' illustrating the elements of the database. Base Unit Cost is the total assembly cost for a given component's labor and material cost. The Base Unit Cost may be an inputted number in the database or may be dynamically derived by linking to subassembly databases for detailed component options such as door assemblies, window assemblies, plumbing assemblies, heating and cooling system assemblies. Adjusted Unit Cost is the cost for the component after adjustment to labor and material cost for a geographic location, adjustment to material cost for sales tax, adjustment to labor and material cost for subcontractor general conditions and if used, adjustment to labor and material cost for escalation. These factors are populated from the "Geographic Factors Database 70".

FIGS. 3*a-b* are a sample portion of Data Collection Tool '20' illustrating the nature of the structure of the tool. The Data Collection Tool is designed to present options to the user for selections. It is organized according to the building component elemental classifications described herein;

FIGS. 4*a-b* are a sample portion of Geographic Factors Database '70' illustrating the nature of the structure of the database. The geographic factors are organized as a record per Zip Code classification and include City, State, regional labor and material adjustment factor, sales tax rate, winter design temperature, heating degree days, summer design temperature, and cooling degree days. subcontractor general conditions and if used, escalation, are populated from the entered Project Criteria '30';

FIGS. 5*a-c* illustrates the output screen of the Energy Model '80'. The energy model dynamically calculates an energy cost estimate of the residence based on the virtual geometry and thermal properties of component options selected according to an embodiment of this invention;

FIGS. 6*a-b* illustrates a sample portion of the output screen for Residential Construction Estimate '100' and shows an example of the Baseline and Alternate modes, wherein the Alternate Selections illustrate The Self-Documenting line item changes to component costs and Self-Correcting feature (Line 022 Basement Excavation) wherein "ERROR" was triggered when "Walkout Basement" was deselected in Design Characteristics '40', requiring selection of Full Basement excavation options. This screen shows the format of how Assemblies of Construction '50' and Assembly Component Options '60' are structured to describe The selected Assemblies of Construction (e.g., 021.00 Basement Slab on Grade) and the selected Component Option(s) for that Assembly (e.g., 4" slab) and The resulting calculated Component Cost, populated from Component Cost Database '10', and the component quantity calculated from the Virtual Geometry;

DETAILED DESCRIPTION OF A PREFERRED EMBODIMENT

Figure 1:
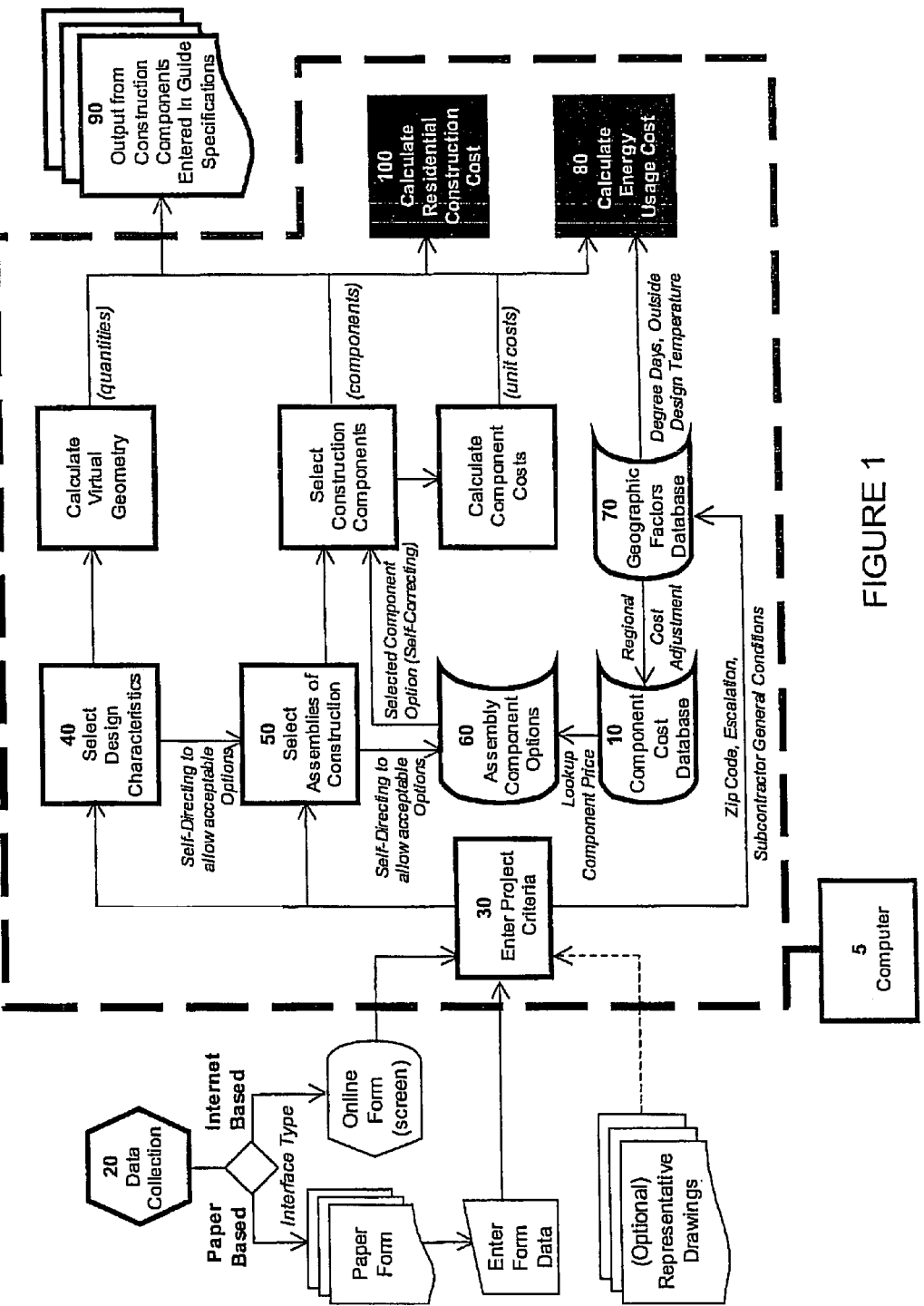
FIG. 1 is a block flow diagram detailing the interrelationships of the various data entry methods, databases and processes of the present invention.
Figure 3A:
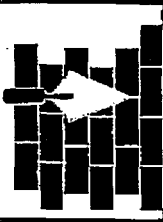

The system architecture is generally described in FIG. 1 showing the interrelationship of the various databases, data entry methods and processes of the invention. The configuration of the Computer 5 (shown by the dashed boundary line) is that of a commercially available computer and consists of a memory device for storage of the databases; input/operation devices including keyboard and mouse for inputting data and making selections; a CPU/logic unit for accessing the databases through the keyboard and mouse and performing the algorithms/logical arguments and calculations commanded by the program; an LCD or CRT monitor for displaying the outcome of the CPU processes; a storage media device such as a magnetic media drive or CD-write drive or other storage media, as technology may enable, to externally store and transmit the summary output of the CPU processes; and a print output device for printing the outcome of the CPU processes. Also internet access to the computer can be used if Internet based data collection is used in Data Collection 20 step of the present invention.

Referring to FIG. 1, there is shown a flow diagram detailing a residential construction estimation process that includes the steps of entering or inputting project criteria, selecting design characteristics, calculating a virtual geometry, selecting appropriate assemblies of construction based on the calculated virtual geometry, selecting appropriate component options based upon the selected assemblies of construction, identifying a regionally adjusted cost of each of the selected component options, and calculating a construction cost of the residence. As can be seen from the flow diagram, the cost is dynamically linked to each of the selected or inputted information of the proceeding steps, such that the cost of the residence is dynamically and specifically modeled at a detailed level.

In a preferred aspect of the present invention, the inputted and selected information can be altered and a new cost is automatically recalculated due to the interaction of the altered information and the step of calculating a cost of the residence. The step of identifying a cost includes an interaction with a database of costs, as shown at 10 in FIG. 1, of the individual inputted and selected information. The database is preferably adjustable such that additional components can be added and various parameters adjusted to reflect geographically appropriate labor and material market conditions, sales tax rates, subcontractor general conditions and escalation. These factors are populated from a geographic factors database 70.

In a preferred aspect of the present invention, information is inputted into a data collection tool 20 prior to the step of inputting project criteria 30 and selecting design characteristics 40, as shown in FIG. 1. The data collection tool 20 can comprise a written questionnaire into which a user enters various information, such that it can be compiled and entered into a computer system. The data collection tool 20 may include representative drawings of the residence detailing the specific structure. If representative drawings are included they may reflect the appropriate stage of design in which the estimate is occurring. Within the conceptual or Early design stage, the drawings may be rough in nature and not to scale. Within the Mid to Final design stages, the drawings may be to scale and more completely developed. The data collection tool may be a web based interface that directly inputs the project criteria into the computer or the data collection tool may be as stated above, a questionnaire with responses that can be inputted into a computer. After inputting the project criteria, various design characteristics may be selected that are stored in the memory of the computer. A virtual geometry which derives quantities of component areas for the residence is then calculated based upon the inputted project criteria and the selected design characteristics of the preceding steps.

Examples of project criteria and design characteristics that may be selected by a user comprise:

Project Identification
1. Project Name
2. City, State
3. Zip Code
4. Target Construction Budget
5. Construction contracting method (General Contractor or Owner/Builder)
6. # of Bedrooms
7. # of Bathrooms Site Characteristics
1. Access Road Length/Width
2. Driveway Length/Width
3. Walkway Length/Width
4. Patio/Terrace Area
5. Retaining Wall Length/Height
6. Deck Area
7. Sprinkler Coverage Area
8. Landscaping Area
9. Lawn Area
10. Electrical Service Entrance Length
11. Lot Location
    a) Subdivision
    b) Open Field
    c) Wooded
    d) Lakefront
    e) Lakefront, Wooded
12. Total Acreage
13. Acres to be Developed
14. Ease of Access to Site
    f) Easy (Road Access Clear)
    g) Moderate
    h) Difficult Home Characteristics
1. Home Style
    a. 1 Story
    b. 1½ Story/Cape Cod
    c. 2 story
2. Roof Style
    a. Hip Roof
    b. Gable Roof
    c. Gambrel Roof
3. Use of 'L' of 'X' Supplemental Gable ends
    a. Also Has Smaller 'L' (3rd) Home Gable End
    b. Also Has Smaller 'X' (3rd and 4th) Home Gable Ends
4. Average Roof Pitch (Rise/Run)
    a. 4:12
    b. 6:12
    c. 8:12
    d. 10:12
    e. 12:12
5. Roof Overhang (Average in inches)
6. Number of House Dormers
7. Number of Garage Dormers
8. Number of Chimneys
    a. None
    b. Direct Vent; No Chimneys
    c. 1 Fireplace/1 Chimney
    d. 2-3 Fireplaces/1 Chimney
    e. 2-3 Fireplaces/2 Chimneys
    f. 3 Fireplaces/2 Chimneys
    g. 3 Fireplaces/3 Chimneys
9. Aspect Ratio of House
    a. 1:1 (Square/Compact)
    b. 2:1 (Rectangular)
    c. 3:1 (Long Rectangle)
    d. 4:1 (Rectangular/"L")
    e. 5:1 (Long/Complex/"U")

Covered Porch
1) Covered Porch Proportions
    a) Length (Feet)
    b) Depth (Feet)
2) Porch Structural System
    a) On Foundation
    b) Over Basement
    c) Decking/Post & Beam Screened Porch
1) Covered Porch Proportions
    a) Length (Feet)
    b) Depth (Feet)
2) Porch Structural System
    a) On Foundation
    b) Over Basement
    c) Decking/Post & Beam Structure
1) Stickbuilt/Dimensional Lumber
2) Full Timber Frame
3) Partial Timber Frame
4) Timber Framing Complexity
    a) Simple; King Post; No Bridge
    b) King Post; Struts; No Bridge
    c) King or Queen Post; Struts; Bridge
    d) Hammer Beam; Curved Struts; Bridge 5) Extent of Timber Frame Use
   a) Amount of FULL Timber Frame (as a % of Ground Floor Area)
   b) Amount of PARTIAL Timber Frame (No Columns) (as a % of Ground Floor Area)

Ceiling Heights
1) Upper Level Ceiling Height
2) Ground Level Ceiling Height
3) Basement Ceiling Height
   a) Exposed Foundation Wall Dimension Doors/Windows
1) Front Door
   a) Standard Front Door
   b) Premium Front Door/Full Glass & Sidelights
2) Number of Exterior Doors (Passage)
3) Number of Exterior Doors (Doorwall)
4) Number of Bay Window Sets
5) % Windows (as % of Ext. Wall Area)
6) Equivalent Number of 2'×4' Roof Skylights Living Areas:

Breezeway
1) Area (Square Feet)
2) Breezeway Ceiling
   a) Flat Ceiling
   b) Vaulted Ceiling
3) Floor System
   a) On Slab
   b) Basement
      i) % of Breezeway Basement that is Finished Ground Floor
1) Area (Square Feet)
2) Ceiling
   a) Flat Ceiling
   b) Vaulted Ceiling
      i) % of ground floor ceiling with cathedral ceiling Upper Level
1) Area (Square Feet) open to floor below
2) Ground Floor Area to Upper Floor Area Adjustment Factor
3) Garage Bonus Space
   a) Garage Bonus Space (with structural insulated panels or lumber roof)
      i) Unfinished Area
      ii) Finished Area
   b) Garage Bonus Space (with attic truss framed roof)
      i) Unfinished Area
      ii) Finished Area Upper Flr Living Area
1) Area (Square Feet) (minus area open to floor below)
2) Ceiling
   a) Flat Ceiling
   b) Vaulted Ceiling
      i) % of upper floor ceiling with vaulted ceiling
3) Loft
   a) Area of loft
4) Upper Floor Railing
   a) Railing overlooking vaulted space Basement
1) Partial
   a) Square Feet of Slab on Grade
2) Full
3) Walkout
   a) Length of Framed Exterior Walkout Wall
4) Garage Basement
   a) % of Garage Basement that is Finished
   b) Provide Lower Grade Access to Garage Basement
5) Finish
   a) Unfinished
   b) % of Basement that is Finished Garage
1) Type
   a) 2 Car-Attached
   b) 3 Car-Attached
   c) 4 Car-Attached
   d) Additional Lower Level 2 Car-Attached (4 car total)
   e) Additional Lower Level 3 Car-Attached (6 car total)
   f) Additional Lower Level 4 Car-Attached (8 car total)
   g) 2 Car-DETACHED
   h) 3 Car-DETACHED
   i) 4 Car-DETACHED
2) Garage Doors
   a) Standard Door Arrangement
   b) Use all single doors Special Spaces
1) Shelled Space (Unfinished)
   a) Shelled Ground Floor area
   b) Shelled Upper Floor area)
2) Spaces Requiring special finishes consideration
   a) Special Space #1; Name; Quantity; Area
   b) Special Space #2; Name; Quantity; Area
   c) Special Space #3; Name; Quantity; Area
   d) Special Space #4; Name; Quantity; Area
   e) Special Space #5; Name; Quantity; Area
   f) Special Space #6; Name; Quantity; Area
   g) Special Space #7; Name; Quantity; Area
   h) Special Space #8; Name; Quantity; Area
   i) Special Space #9; Name; Quantity; Area
   j) Special Space #10; Name; Quantity; Area Logical formulas are stored in the computer memory for use in the residential construction estimation process. The formulas link various portions of the process, as well as make the process self-correcting and self-directing. Self-correcting may be defined in terms of an if-then-else logical argument that contains elements necessary to prevent faulty inputs and selections from being made and alerting a user to an unacceptable or non-conforming selection. For example, if the selected design characteristic of "STRUCTURE: Stickbuilt/Dimensional Lumber" was programmed and system construction components of "8-inch poured concrete foundation wall", "2×4 exterior stud wall framing", and an exterior skin of "cement fiber siding" were selected, then the system would allow the choices and a cost would be calculated. If the system construction component of exterior skin were changed from "cement fiber siding" to "4-inch common brick veneer" then the system would indicate an ERROR, precluding the selection, because the total construction assembly thickness of the "2×4 exterior stud wall framing" (4 inches) and the thickness of the brick veneer and required air-space behind the brick (5 inches) exceeds the foundation wall thickness of 8 inches, rendering the process self-correcting. Once a selection of a 10-inch thick or greater foundation wall was made, the system would allow calculation of the construction cost.

An if-then-else argument may be used to prevent or enable various selections based on a previous selected item. The term self-directing can be defined in terms of an if-then-else logical argument to enable or preclude other selected components from being selected. For example, IF the selected design characteristics of "Roof Style: Gable Roof" with a roof pitch selection of "10:12" were selected, THEN the component options for Roofing System including asphalt, wood, slate and metal, are enabled only in roof systems options for gable roofs with a 10:12 pitch, and selections are prevented for any hip roof systems of any pitch or any gable roof systems with 4:12, 6:12, 8:12 or 12:12 pitches.

The inputted and selected information of the process is essentially a hierarchy of selected characteristics that interact via logical arguments to further limit or enable the information that may be selected after a preceding characteristic. As shown in FIG. 1, the selected design characteristics 40 are self directing and self-correcting in relation to the assemblies of construction 50. Similarly, the component options 60 are self-directed and self-corrected by the selected assemblies of construction 50 in the previous step. In this manner, various elements of a residential design can be broken down into assemblies and subassemblies to define an overall construction cost. As stated above, the logical arguments and self-directing and self-correcting features provide an interaction between the various selected and inputted information allowing for improved quality control of the data entering and characteristic selection process, and provides the ability to limit errors associated with generating a residential construction estimate.

In a preferred aspect of the present invention, the assemblies of construction are organized in a unique building component elemental classification structure comprising:

SYSTEM
  SUBSYSTEM
    ASSEMBLY
01 Foundation
  011 Standard Foundations
    011.10 Spread footings (timber columns)
    011.10 Spread footings (lally columns)
    011.20 Spread footings (foundation walls)
    011.20 Spread footings (basement walls)
    011.30 Foundation Wall
    011.40 Excavation: Foundation Wall Footing
  012 Special Foundations
02 Substructure
  021 Slab on Grade
    021.00 Ground Floor Slab on Grade
    021.00 Garage Floor Slab on Grade
    021.00 Basement Slab on Grade
    021.10 Basement Slab Insulation
  022 Excavation: Basement
    022.00 Off Site Trucking
  023 Basement Walls
    023.00 Partial Height Basement Wall Framing
    023.10 Basement Wall Insulation
03 Superstructure
  031 Floor Construction
    031.10 Floor Framing
    031.10 Floor Framing (Garage Bonus Space)
    031.10 Floor Framing (Supported Garage Floor)
    031.15 Floor (Covered Porch-with steps)
    031.15 Floor (Screened Porch)
    031.20 Special Floor Construction
  032 Roof Construction
    032.10 Roof Framing—House
    032.10 Roof Framing—Breezeway
    032.10 Roof Framing—(Screened Porch)
    032.10 Roof Framing—Garage
    032.10 Covered Porch Roof Deck
    032.10 Covered Porch Roof Frame
    032.10 Covered Porch Frame (Supplemental)
    032.10 Roof Framing—Dormers
    032.20 Timber Frame (cols/beams/rafters)
    032.30 Roof SIP (House) on Timber Frame
    032.30 Roof SIP (House) on SIP Frame Non-Vaulted Ceiling Support
    032.30 Roof SIP on SIP Frame (Breezeway)
    032.30 Roof SIP on SIP Frame (Garage)
    032.40 Special Roof Construction
  033 Stair Construction
    033.10 Basement Stair
    033.20 Main Ground Flr Stair
    033.30 Auxiliary or Garage Stair
04 Exterior Closure
  041 Exterior Walls
    041.10 Wall Framing—House (primary)
    041.10 Wall Framing—House (supplemental)
    041.10 Wall Framing—Walkout Level
    041.10 Wall Framing—Breezeway
    041.10 Wall Framing—Screened Porch
    041.10 Wall Framing—Garage
    041.20 Ext. Skin—House (primary)
    041.20 Ext. Skin—House (supplemental)
    041.20 Ext. Skin—Above Ground Foundation
    041.20 Ext. Skin—House Gables/Dormers
    041.20 Ext. Skin—Chimney
    041.20 Ext. Skin—Breezeway
    041.20 Ext. Skin—Garage
    041.20 Ext. Skin—Garage Gable/Dormers
    041.30 Special Brick Wall Construction
    041.30 Special Exterior Trim
  042 Exterior Windows
    042.10 Ext. Windows—Fixed
    042.10 Ext. Windows—Double Hung
    042.10 Ext. Windows—Casement
    042.10 Ext. Windows—Sliding
    042.10 Ext. Windows—Bay
    042.10 Basement Egress Windows
    042.20 Exterior Shutters
  043 Exterior Doors
    043.10 Ext. Doors—Entry Doorway
    043.10 Ext. Doors—Passage
    043.10 Ext. Doors—Basement Access
    043.10 Ext. Doors—Garage Fire Rated Door
    043.10 Ext. Doors—Sliding Doorwall
    043.10 Ext. Doors—Garage (1 Car)
    043.10 Ext. Doors—Garage (2 Car)
05 Roofing
  050.00 House Roofing System
    050.00 House Roofing Material
  050.25 Porch (Covered) Roofing System
    050.25 Porch Roofing Material
  050.50 Porch (Screened) Roofing System
    050.50 Porch Roofing Material
  051.00 Valley
    051.00 Gutters/Downspouts
  051.10 Soffit/Fascia
  051.20 Dormer Flashing/Soffit/Fascia
  051.30 House/Breezeway Insulation
  051.35 Garage Insulation
  051.40 Roof Skylight
  051.50 Roof Accessories 06 Interior Construction
  061 Partitions
    061.10 Interior Partitions (House, Breezeway)
    061.10 Interior Partitions (Basement Perimeter)
    061.10 Interior Partitions (Basement)
    Loft/Bridge Railings
    061.15 2nd Level Railings
    Interior Doors
    061.20 Interior Doors (passage/closet)
    061.20 Interior Doors (special)
  062 Interior Finishes
    Walls (typical)
    062.10 Walls (House, Breezeway)
    062.10 Wall Wainscot
    062.10 Walls (Finished Basement)
    062.10 Walls [Garage size]—Attached Garage
    062.20 Finish (House, Breezeway)
    062.20 Finish (Finished Basement)
    062.20 Finish [Garage size]
    Ceiling (typical)
    062.11 Ceiling (House, Breezeway)
    062.11 Ceiling (Timber Cathedral Ceiling)
    062.11 Ceiling (Screened Porch)
    062.11 Ceiling (Finished Basement)
    062.11 Ceiling Garage Vaulted or Bonus Space
    062.11 Ceiling [Garage size]—Attached—Under Bonus
    062.21 Finish (House, Breezeway)
    062.21 Finish (Screened Porch)
    062.21 Finish (Finished Basement)
    062.21 Finish [Garage size]
    Flooring (typical)
    062.30 Floor (House)
    062.30 Floor (House) Supplemental
    062.30 Floor (Breezeway)
    062.30 Floor (Screened Porch)
    062.30 Floor (Finished Basement)
    062.30 Floor [Garage size—all garage floors]
    PREMIUM FINISHED SPACES:
    Special Space: EXAMPLE 1
    062.20 Premium Wall Finish (PWF)
    062.30 Premium Floor Finish (PFF)
    063.20 Kitchen Cabinets
    063.25 Counter
    063.26 Counter Backsplash Wall
    Special Space: EXAMPLE 2
    062.20 Premium Wall Finish (PWF)
    062.30 Premium Floor Finish (PFF)
    063.20 Bathroom Vanity
    063.25 Counter/sink (see 081.20)
    063.26 Counter Backsplash Wall
    063.30 Tub/Shower Enclosures
    063.35 Bath Accessories
  063 Interior Specialties
    063.10 Window Casing
    063.11 Door Casing
    063.12 Crown Molding—Upper Level
    063.13 Base Molding—Upper Level
    063.12 Crown Molding—Lower Level
    063.13 Base Molding—Lower Level
    063.12 Crown Molding—Basement Level
    063.13 Base Molding—Basement Level
    063.20 Decorative Columns
07 Conveying Systems
  071 Elevator
    071.10 Electric Elevator
    071.20 Dumbwaiter
08 Mechanical
  081 Plumbing
    Water Supply/Treatment
    081.10 Supply/Waste
    081.10 Waste (Basement Rough-Ins)
    081.10 Hot Water Heater
    081.10 Water Softener
    Bathroom Fixtures
    081.20 Vanity Sink/Faucet
    081.21 Water Closet
    081.22 Tub/Shower/Faucet
    081.23 Tiled Shower Receptor
    Kitchen Fixtures
    081.30 Kitchen Sink/Faucet
    081.31 Auxiliary Sink/Faucet
    Service Fixtures
    081.30 Service Sink/Faucet
    Special Plumbing Systems
    081.30 Special Plumbing
  082 HVAC
    082.10 Furnace (200,000 BTUH)
    082.10 Furnace (150,000 BTUH)
    082.10 Furnace (120,000 BTUH)
    082.10 Furnace (100,000 BTUH)
    082.10 Multi-Zone (Motorized Damper)
    082.10 Split Furnace HVAC systems
    082.15 Radiant Heat (Basement/Garage Slabs Only)
    082.20 Fireplace/Chimney System
    082.30 Garage Heat
  083 Fire Protection
    083.10 Wet Pipe Sprinkler System
  084 Special Mechanical Systems
    084.10 Mechanical Ventilation
09 Electrical
  091 Service & Distribution
    091.10 Electrical Panel
    091.10 Electrical Distribution
  092 Lighting
    092.10 Fixed Lighting
    092.10 Fixed Lighting (Finished Basement)
  093 Special Electrical Systems
    093.10 Special Electrical
10 General Conditions, Overhead & Profit (GC, OH&P)
  100 GC, OH&P
    100.00 Owner Role
    100.10 General Conditions/overhead
    100.11 Supervision
    100.12 Profit (on Construction, GC, OH)
  105 Home Design and Drafting Fees
    110.00 Home Design/Drafting
11 Fixed Equipment
  111 Residential Appliances
    111.10 Range/Oven
    111.11 Range Hood
    111.12 Drop-in Cooktop
    111.13 Warming Drawer
    111.14 Dishwasher
    111.15 Refrigerator/Freezer
    111.16 Undercounter Refrigerator
    111.17 Microwave
    111.18 Garbage Compactor
    111.19 Washer/Dryer
    111.20 Appliance Hook Ups/Installation
  112 Furnishings
    112.10 Window Treatments
    112.20 Special Millwork/Cabinet
    112.30 Closets and Shelving 113 Special Construction
  113.10 Sauna
  113.10 Other
  113.20 Special Line Item Allowance
12 Sitework
  121 Site Preparation
    121.10 Site clearing
    121.20 Rough/fine grading
  122 Site Improvements
    122.10 Access Road
    122.20 Driveway
    122.20 Driveway Apron
    122.30 Garage Apron
    122.40 Walk
    122.50 Entry Stoop (Open)
    122.60 Wood Deck System (open)
      Wood Deck (Covered Porch Floor)
      Wood Deck (Screened Porch Floor)
    122.70 Terrace/Patio
    122.75 Exterior Wall
      Retaining Wall Skin
    122.80 Sprinkler System/Irrigation
    122.90 Lawn
    122.95 Landscaping
  123 Site Utilities
    123.10 Gas Service
    123.20 Electrical Service
    123.30 Water Service
    123.40 Well Drilling
    123.45 Well Pressure System
    123.50 Sanitary Sewer Service
    123.60 Septic Tank System As can be seen, the building component elemental classifications are unique and improved over prior art technology in that they are based on the UNIFORMAT standard for only the construction system and select subsystem titles, but include further functionally descriptive materials such as assemblies and subassemblies of construction that are unique to residential buildings.

Within the unique assemblies of construction, elemental classifications are functionally descriptive component options. Selection of desired component options further define the construction attributes of an assembly of construction leading to the capability to dynamically model a residential construction estimate at a detailed level, including at a room level for special spaces.

The component options further define the assemblies of construction components and are preferably selected from the group comprising:

House

Column Spread Footings
1 12" thick-30"×30"; forms, rebar, concrete
2 12" thick-36"×36"; forms, rebar, concrete
3 12" thick-42"×42"; forms, rebar, concrete Wall Spread Footings
1 Not Req'd (Trench Footing)
2 12" thick×18" wide; forms, reinf, direct chute
3 12" thick×18" wide; forms, reinf, direct chute, PVC 6" gravel drainbed
4 12" thick×24" wide; forms, reinf, direct chute
5 12" thick×24" wide; forms, reinf, direct chute, PVC 6" gravel drainbed
6 (For Precast Foundations) 12" thick×24" wide; ¾" stone bedding Foundation Wall
1 Poured-8"; bitum/damp; sill plates
2 Poured-10"; bitum/damp; sill plates
3 Poured-10"; brickledge; bitum/damp; sill plates
4 Poured-12"; bitum/damp; sill plates
5 Poured-12"; brickledge; bitum/damp; sill plates
6 Block-8", grouted; bitum/damp; parging; sill plates
7 Block-10", grouted; bitum/damp; parging; sill plates
8 Block-12", grouted; brickledge; parging; bitum/damp; sill plates
9 Pre-Cast Wall System, bitum/damp; sill plates
10 ICF (Insulated Concrete Foundation); sill plates
11 Trench footing/grade beam; 12" poured/reinf; earth formed; no insul
12 Wood 2×8; 16"OC; CDX sheathing; vapor; 9" insul R-30
13 Temperate Zone: Trench footing; 12" depth, 12" wide poured/reinf; earth formed; no insul Footing Excavation
1 Trench footing excavation (4' depth); rough grade
2 4' depth spread ftg excav; sand/gravel; backfill; no compct'n; rough grade
3 4' depth spread ftg excav; sand/clay; backfill; no compct'n; rough grade Special Foundation
1 No additional special foundations
2 Average additional special foundations/soil issues
3 Above average additional special foundations/soil issues Basement Excavation
1 Full: Sand & gravel excav; backfill; compaction 8" lifts; rough grade
2 Full: Clay, gravel borrow for backfill; compaction 8" lifts; rough grade
3 Walkout: Sand & gravel excav; backfill; compaction 8" lifts; rough grade
4 Walkout: Clay, gravel borrow for backfill; compaction 8" lifts; rough grade Excavation Hauling
1 Assumes off-site hauling NOT required (Assumes on site placement of spoils)
2 Assume inability to place excavated soils on site; HAUL; 12CY truck; 1.6 loads/hr Slab On Grade
1 Not Used
2 CRAWL SPACE: 2" cover slab w/gravel base; 6 mil vap; expan mat'l; W1.4/W1.4; steel trowel finish
3 4" slab w/4" gravel base; 6 mil vap; expan mat'l; W1.4/W1.4; steel trowel finish
4 5" slab w/4" gravel base; 6 mil vap; expan mat'l; W1.4/W1.4; steel trowel finish
5 6" slab w/4" gravel base; 6 mil vap; expan mat'l; W1.4/W1.4; steel trowel finish Basement Wall
1 Poured-8"; bitum/damp; sill plates
2 Poured-10"; bitum/damp; sill plates
3 Poured-10"; brickledge; bitum/damp; sill plates
4 Poured-12"; bitum/damp; sill plates
6 Block-8", grouted; bitum/damp; parging; sill plates
7 Block-8", grouted; bitum/damp; parging; sill plates
8 Block-10", grouted; bitum/damp; parging; sill plates
9 Block-12", grouted; brickledge; parging; bitum/damp; sill plates
10 Pre-Cast Wall System, furring ribs; bitum/damp; sill plates
11 ICF (Insulated Concrete Foundation); sill plates
12 Wood 2×8; 16"OC; CDX sheathing; vapor; 9" insul R-30

Basement Insulation
1 None
2 1" rigid-25 PSI Compressive (R-5)
3 2" rigid-25 PSI Compressive (R-10)
4 3" rigid-25 PSI Compressive (R-15) ENERGY STAR COMPLIANT
5 Fiberglass; foil faced batt; 3 ½" thick R-11 (Interior 2×4 Perimeter Wall)

Slab Insulation
1 Not Used
2 PERIMETER: 2" polystyrene, R8; 24" wide
3 COMPLETE: UNDERSLAB: 2" polystyrene, R8

Elevated Floor
1 2×10 (16'), 16"OC; bridging; 1×3 furring; box sills; girder/lally; ¾" T&G OSB subflr
2 2×12 (19'), 16"OC; bridging; 1×3 furring; box sills; girder/lally; ¾" T&G OSB subflr
3 Exposed 2×6 T&G #2 pine floor only; Timber Joists part of Timber Pkg
4 Comp. "1" joist, 9.5" (15'), 16"OC; rim joist; girder/lally, ¾" T&G OSB subflr
5 Comp. "1" joist, 11.5" (18'), 16"OC; rim joist; girder/lally, ¾" T&G OSB subflr
6 Comp. "4" joist, 14" (22'), 16"OC; rim joist; girder/lally, ¾" T&G OSB subflr
7 Comp. "1" joist, 16" (24'), 16"OC; rim joist; girder/lally, ¾" T&G OSB subflr
8 Trussjoist, 12" (21'), 16"OC; 1×3 furring; girder/lally; ¾" T&G OSB subflr
9 Trussjoist, 14" (22'), 16"OC; 1×3 furring; girder/lally; ¾" T&G OSB subflr
10 Trussjoist, 16" (24'), 16"OC; 1×3 furring; girder/lally; ¾" T&G OSB subflr Non-Vaulted Ceiling Support
1 Wood, 2×10 (16'), 16"OC; bridging; 1×3 furring
2 Wood, 2×12 (19'), 16"OC; bridging; 1×3 furring
3 Comp. "1" joist, 9.5" (15'), 16"OC
4 Comp. "1" joist, 11.5" (18'), 16"OC
5 Comp. "1" joist, 14" (22'), 16"OC
6 Comp. "1" joist, 16" (24'), 16"OC
7 Trussjoist, 12" (21'), 16"OC; 1×3 furring
8 Trussjoist, 14" (22'), 16"OC; 1×3 furring
9 Trussjoist, 16" (24'), 16"OC; 1×3 furring Elevated Garage Floor
1 Wood, 2×10 (16'), 16"OC; bridging; furring; box sills; girder/lally; ¾" T&G OSB subflr
2 Comp. "1" joist, 9.5" (15'), 16"OC; bridging; box sills; girder/lally, ¾' T&G OSB subflr
3 Comp. "1" joist, 11.5" (18'), 16"OC; rim joist; girder/lally, ¾" T&G OSB subflr
4 Trussjoist, 12" (21'), 16"OC; furring; girder/lally; ¾" T&G OSB subflr
5 Hollow Core Precast Plank; 2" concrete topping Special Floor
1 No additional special floor framing construction
2 Some special floor framing features (e.g., cantilever, step down)
3 Above average additional floor framing complexity Dormer
1 2×6 rafters (valley,cripple,dormer); headers; 16"OC; ½" CDX sheathing
2 2×8 rafters (valley,cripple,dormer); headers; 16"OC; ½" CDX sheathing
3 SIP 4.5" thick; 7/16" OSB/OSB; 5⅝" MEPS; R-18; 3.30 #/SF
4 SIP 6.5" thick; 7/16" OSB/OSB; 5⅝" MEPS; R-27; 3.47 #/SF
5 SIP 8.25" thick; 7/16" OSB/OSB; 7⅜" MEPS; R-34; 3.61 #/SF
6 SIP 10.25" thick; 7/16" OSB/OSB; 9⅜" MEPS; R-42; 3.78 #/SF Gable Roof 4:12 roof pitch
1 Flat Roof; 2×10 joists; 16"OC; ⅝" CDX sheathing; fascia; 1×3 clg furring
2 4:12; 2×6 rafters; 16"OC; ½" CDX sheathing; fascia, 1×3 clg furring
3 4:12; 2×8 rafters; 16"OC; ½" CDX sheathing; fascia; 1×3 clg furring
4 4:12; 2×10 rafters; 16"OC; ½" CDX sheathing; fascia; 1×3 clg furring
5 4:12; Truss 40#; 16"OC; ½" CDX sheathing; fascia; 1×3 clg furring
6 4:12; Truss 40#; 24"OC; ½" CDX sheathing; fascia; 1×3 clg furring Gable Roof 6:12 roof pitch
1 Flat Roof; 2×10 joists; 16"OC; ⅝" CDX sheathing; fascia; 1×3 clg furring
2 6:12; 2×6 rafters; 16"OC; ½" CDX sheathing; fascia; 1×3 clg furring
3 6:12; 2×8 rafters; 16"OC; ½" CDX sheathing; fascia; 1×3 clg furring
4 6:12; 2×10 rafters; 16"OC; ½" CDX sheathing; fascia; 1×3 clg furring
5 6:12; Truss 40#; 16"OC; ½" CDX sheathing; fascia; 1×3 clg furring
6 6:12; Truss 40#; 24"OC; ½" CDX sheathing; fascia; 1×3 clg furring Gable Roof 8:12 roof pitch
1 Flat Roof; 2×10 joists; 16"OC; ⅝" CDX sheathing; fascia; 1×3 clg furring
2 8:12; 2×6 rafters; 16"OC; ½" CDX sheathing; fascia; 1×3 clg furring
3 8:12; 2×8 rafters; 16"OC; ½" CDX sheathing; fascia; 1×3 clg furring
4 8:12; 2×10 rafters; 16"OC; ½" CDX sheathing; fascia; 1×3 clg furring
5 8:12; Truss 40#; 16"OC; ½" CDX sheathing; fascia; 1×3 clg furring
6 8:12; Truss 40#; 24"OC; ½" CDX sheathing; fascia; 1×3 clg furring Gable Roof 10:12 roof pitch
1 Flat Roof; 2×10 joists; 16"OC; ⅝" CDX sheathing; fascia; 1×3 clg furring
2 10:12; 2×6 rafters; 16"OC; ½" CDX sheathing; fascia; 1×3 clg furring
3 10:12; 2×8 rafters; 16"OC; ½" CDX sheathing; fascia; 1×3 clg furring
4 10:12; 2×10 rafters; 16"OC; ½" CDX sheathing; fascia; 1×3 clg furring
5 10:12; Truss 40#; 16"OC; ½" CDX sheathing; fascia; 1×3 clg furring
6 10:12; ATTIC Truss 40#; 16"OC; ½" CDX sheath/floor; fascia; 1×3 clg furring
7 10:12; Truss 40#; 24"OC; ½" CDX sheathing; fascia; 1×3 clg furring
8 10:12; ATTIC Truss 40#; 24"OC; ½" CDX sheath/floor; fascia; 1×3 clg furring Gable Roof 12:12 roof pitch
1 Flat Roof; 2×10 joists; 16"OC; ⅝" CDX sheathing; fascia; 1×3 clg furring
2 12:12; 2×6 rafters; 16"OC; ½" CDX sheathing; fascia; 1×3 clg furring
3 12:12; 2×8 rafters; 16"OC; ½" CDX sheathing; fascia; 1×3 clg furring
4 12:12; 2×10 rafters; 16"OC; ½" CDX sheathing; fascia; 1×3 clg furring
5 12:12; Truss 40#; 16"OC; ½" CDX sheathing; fascia; 1×3 clg furring
6 12:12; ATTIC Truss 40#; 16"OC; ½" CDX sheath/floor; fascia; 1×3 clg furring
7 12:12; Truss 40#; 24"OC; ½" CDX sheathing; fascia; 1×3 clg furring
8 12:12; ATTIC Truss 40#; 24"OC; ½" CDX sheath/floor; fascia; 1×3 clg furring Hip Roof 4:12 roof pitch
1 Flat Roof; 2×10 joists; 16"OC; ⅝" CDX sheathing; fascia; 1×3 clg furring
2 4:12; 2×6 hip/jack rafters; 16"OC; ½" CDX sheathing; fascia; 1×3 clg furring
3 4:12; 2×8 hip/jack rafters; 16"OC; ½" CDX sheathing; fascia; 1×3 clg furring
4 4:12; 2×10 hip/jack rafters; 16"OC; ½" CDX sheathing; fascia; 1×3 clg furring
5 4:12; Hip Truss 40#; 16"OC; ½" CDX sheathing; fascia; 1×3 clg furring
6 4:12; Hip Truss 40#; 24"OC; ½" CDX sheathing; fascia; 1×3 clg furring Hip Roof 6:12 roof pitch
1 Flat Roof; 2×10 joists; 16"OC; ⅝" CDX sheathing; fascia; 1×3 clg furring
2 6:12; 2×6 hip/jack rafters; 16"OC; ½" CDX sheathing; fascia; 1×3 clg furring
3 6:12; 2×8 hip/jack rafters; 16"OC; ½" CDX sheathing; fascia; 1×3 clg furring
4 6:12; 2×10 hip/jack rafters; 16"OC; ½" CDX sheathing; fascia; 1×3 clg furring
5 6:12; Hip Truss 40#; 16"OC; ½" CDX sheathing; fascia; 1×3 clg furring
6 6:12; Hip Truss 40#; 24"OC; ½" CDX sheathing; fascia; 1×3 clg furring Hip Roof 8:12 roof pitch
1 Flat Roof; 2×10 joists; 16"OC; ⅝" CDX sheathing; fascia; 1×3 clg furring
2 8:12; 2×6 hip/jack rafters; 16"OC; ½" CDX sheathing; fascia; 1×3 clg furring
3 8:12; 2×8 hip/jack rafters; 16"OC; ½" CDX sheathing; fascia; 1×3 clg furring
4 8:12; 2×0 hip/jack rafters; 16"OC; ½" CDX sheathing; fascia; 1×3 clg furring
5 8:12; Hip Truss 40#; 16"OC; ½" CDX sheathing; fascia; 1×3 clg furring
6 8:12; Hip Truss 40#; 24"OC; ½" CDX sheathing; fascia; 1×3 clg furring Hip Roof 10:12 roof pitch
1 Flat Roof; 2×10 joists; 16"OC; ⅝" CDX sheathing; fascia; 1×3 clg furring
2 10:12; 2×6 hip/jack rafters; 16"OC; ½" CDX sheathing; fascia; 1×3 clg furring
3 10:12; 2×8 hip/jack rafters; 16"OC; ½" CDX sheathing; fascia; 1×3 clg furring
4 10:12; 2×10 hip/jack rafters; 16"OC; ½" CDX sheathing; fascia; 1×3 clg furring
5 10:12; Hip Truss 40#; 16"OC; ½" CDX sheathing; fascia; 1×3 clg furring
6 10:12; Hip Truss 40#; 24"OC; ½" CDX sheathing; fascia; 1×3 clg furring Hip Roof 12:12 roof pitch
1 Flat Roof; 2×10 joists; 16"OC; ⅝" CDX sheathing; fascia; 1×3 clg furring
2 12:12; 2×6 hip/jack rafters; 16"OC; ½" CDX sheathing; fascia; 1×3 clg furring
3 12:12; 2×8 hip/jack rafters; 16"OC; ½" CDX sheathing; fascia; 1×3 clg furring
4 12:12; 2×10 hip/jack rafters; 16"OC; ½" CDX sheathing; fascia; 1×3 clg furring
5 12:12; Hip Truss 40#; 16"OC; ½" CDX sheathing; fascia; 1×3 clg furring
6 12:12; Hip Truss 40#; 24"OC; ½" CDX sheathing; fascia; 1×3 clg furring Special Roof
1 No additional special roof construction
2 Some special roof framing features (e.g., stepped heights, turret, eyebrow windows)
3 Above average additional special roof framing complexity Timber Frame
1 Pine Timber Frame (PARTIAL), Hammer Beam; Curved Struts; Bridge
2 Oak Timber Frame (PARTIAL), Hammer Beam; Curved Struts; Bridge
3 Fir Timber Frame (PARTIAL), Hammer Beam; Curved Struts; Bridge
4 Kiln Dried Oak Timber Frame (PARTIAL), Hammer Beam; Curved Struts; Bridge
5 Reclaimed Timber Frame (PARTIAL), Hammer Beam; Curved Struts; Bridge SIP Structural Insulated Panel; Modified Expanded Polystyrene (MEPS) Insulation
1 SIP 4.5" thick; ⁷⁄₁₆" OSB/OSB; 3⅝" MEPS; R-18; 3.30 #/SF
2 SIP 6.5" thick; ⁷⁄₁₆" OSB/OSB; 5⅝" MEPS; R-27; 3.47 #/SF
3 SIP 8.25" thick; ⁷⁄₁₆" OSB/OSB; 7⅜" MEPS; R-34; 3.61 #/SF
4 SIP 10.25" thick; ⁷⁄₁₆" OSB/OSB; 9⅜" MEPS; R-42; 3.78 #/SF
5 SIP 12.25" thick; ⁷⁄₁₆" OSB/OSB; 11⅜" MEPS; R-45; 3.95 #/SF SIP Finish
1 ½" Gyp Bd; unfinished; joints under purlins or rafters; 1.79 #/SF
2 ½" Gyp Bd; taped & sanded; unfinished 1.80 #/SF
3 Tongue & Groove; pine; finished; 1.20 #/SF
4 Tongue & Groove; fir; finished; 1.20 #/SF
5 Tongue & Groove; 3×Laminated; finished; 1.20 #/SF Stair
1 None
2 Basement stairs, open riser
3 Basement Egress stairs; steel, prefabricated
4 Pine treads/risers (pine), box stairs, WALLS 2 SIDES/handrail only
5 Pine treads/risers (pine), box stairs, balusters/handrail, newel post
6 Hardwood treads/risers (beech), box stairs, WALLS 2 SIDES/handrail only
7 Hardwood treads/risers (beech), box stairs, balusters/handrail, newel post 8 Curved stairway (oak), 3'-3" wide, open 1 side
9 Curved stairway (oak), 3'-3" wide, open 2 sides Auxiliary Stair
1 None
2 Attic stair; folding; pine; 8'-6"
3 Pine treads/risers (pine), box stairs, WALLS 2 SIDES/ handrail only
4 Pine treads/risers (pine), box stairs, balusters/handrail, newel post
5 Hardwood treads/risers (beech), box stairs, WALLS 2 SIDES/handrail only
6 Hardwood treads/risers (beech), box stairs, balusters/ handrail, newel post
7 Spiral stairs, oak, 4'-6" dia, prefab
8 Spiral stairs, aluminum, 5'-0" dia, stock unit
9 Spiral stairs, aluminum, 5'-0" dia, custom unit
10 Spiral stairs, cast iron, 4'-0" dia, custom unit
11 Steel, industrial, pre-erected, 3'-6" wide, rail Exterior Frame System
1 2×4; 16"OC; 3½" R-13; ½" CDX shthg; corner bracing
2 2×6; 16"OC; 6" R-19; ½" CDX shthg; corner bracing
3 SIP 4.5" thick; 7/16" OSB/OSB; 3⅝" MEPS; R-18; 3.30 #/SF
4 SIP 6.5" thick; 7/16" OSB/OSB; 5⅝" MEPS; R-27; 3.47 #/SF
5 SIP 8.25" thick; 7/16" OSB/OSB; 7⅜" MEPS; R-34; 3.61 #/SF Screen Porch
1 Covered Only; Future Screened Porch Panels
2 Full height screen panels; wood frame, painted
3 3 SEASON PORCH FRAMING (windows see 042): 2×4; 16"OC; 3½" R-13; ½" CDX Infiltration
1 Standard Stick Built
2 Tight Stick Built
3 Energy Star Minimum
4 Energy Star Very Tight Exterior Skin
1 Vinyl; dbl 4" pattern 8" wide, color, no backer insul bd; trim, Tyvek
2 Aluminum; dbl 4" pattern 8" wide, color, no backer insul bd; trim, Tyvek
3 Board & Batten; 1×1 0 Fir; Cedar battens; Tyvek; cedar trim, stain, sealer 1 coat
4 Cement Fiber; 6" wide beveled; wd grain; Tyvek; cedar trim, paint/primer 1 coat
5 Cement Fiber; 6" wide; shake style; Tyvek; cedar trim, paint/primer 1 coat
6 Cement Fiber; Stucco patterned panel; Tyvek; cedar trim, paint/primer 1 coat
7 Cedar 1×8 Vertical Channel Siding; Tyvek; cedar trim; natural—no finish
8 Cedar 1×8 Vertical Channel Siding; Tyvek; cedar trim; sealer 1 coat-stain 1 coat
9 Cedar 1×8 Vertical Channel Siding; Tyvek; cedar trim; paint (2 coats)/primer
10 Cedar shingles (white); 5" exp; grade A; Tyvek; cedar trim; paint/primer 1 coat
11 Unfinished
12 Cedar shingles (white) UNFINISHED; 5" exp; grade A; Tyvek; cedar trim
13 Cedar No. 1 Perfections (red); 5½" exp; Tyvek; cedar trim; paint/primer 1 coat
14 Cedar shake, hand split; 8½" exp; Tyvek; cedar trim; paint/primer 1 coat
15 Cedar siding, beveled; ½"×8"; grade A; Tyvek; cedar trim; paint/primer 2 coat
16 8" Wood Log Siding; 2"; Tyvek; wood trim; sealer—1 coat; stain—1 coat
17 Stucco; 2 coats (¾" thick); painted 2 coats; 30# bldg paper; galv. metal lath (on wood substrate)
18 Stucco; 3 coats (1" thick); painted 2 coats; 30# bldg paper; galv. metal lath (on wood substrate)
19 Residential EIFS (Exterior Insulation/Finish System); 1" EPS insulation; colored/textured
20 Mortarless Brick Veneer (e.g., Novabrik); 1×3 furring at 16" oc; Tyvek; 1×4 trim painted
21 4" Select common brick veneer; wall ties; Tyvek; 1×4 trim painted
22 4" Buff or grey face brick veneer; wall ties; Tyvek; 1×4 trim painted
23 4" Concrete brick veneer; wall ties; Tyvek; 1×4 trim painted
24 Cultured (cast concrete) stone-Ave; rough stone; Tyvek
25 Stone work; rough stone; wall ties; Tyvek; 1×4 trim painted Special Exterior Wall
1 No additional special exterior wall construction
2 Some special brick features (e.g., quoins, soldier course windows)
3 Above average additional brick complexity
4 Special brickwork, moderate scaled feature entry porch
5 Special brickwork, grand scaled feature entry archway/ columns Special Exterior Trim
1 No additional special exterior trim
2 Some special trim features (e.g., deep moldings at windows)
3 Above average additional trim complexity
4 Extensive special trim features Exterior Window-Double Hung
1 Wood; Double Glazing-low E; snap muntins; paint int/ext 2 cts; int. trim; caulk
2 Solid Vinyl; Double Glazing-low E; snap muntins; int. trim; caulk
3 Vinyl Clad; Double Glazing-low E; snap muntins; paint interior 2 cts; int. trim; caulk
4 Metal Clad; Double Glazing-low E; snap muntins; paint interior 2 cts; int. trim; caulk
5 Wood; Double Glazing; standard glass; snap muntins; paint int/ext 2 cts; int. trim; caulk
6 Solid Vinyl; Double Glazing; standard glass; snap muntins; int. trim; caulk
7 Vinyl Clad; Double Glazing; standard glass; snap muntins; paint interior 2 cts; int. trim; caulk
8 Metal Clad; Double Glazing; standard glass; snap muntins; paint interior 2 cts; int. trim; caulk
9 Wood; Triple Glazing-low E; snap muntins; paint int/ext 2 cts; int. trim; caulk
10 Solid Vinyl; Triple Glazing-low E; snap muntins; int. trim; caulk
11 Vinyl Clad; Triple Glazing-low E; snap muntins; paint interior 2 cts; int. trim; caulk
12 Metal Clad; Triple Glazing-low E; snap muntins; paint interior 2 cts; int. trim; caulk Exterior Window—Casement
1. Wood; Double Glazing-low E; snap muntins; paint int/ext 2 cts; int. trim; caulk
2. Solid Vinyl; Double Glazing-low E; snap muntins; int. trim; caulk
3. Vinyl Clad; Double Glazing-low E; snap muntins; paint interior 2 cts; int. trim; caulk
4. Metal Clad; Double Glazing-low E; snap muntins; paint interior 2 cts; int. trim; caulk
5. Wood; Double Glazing; standard glass; snap muntins; paint int/ext 2 cts; int. trim; caulk
6. Solid Vinyl; Double Glazing; standard glass; snap muntins; int. trim; caulk
7. Vinyl Clad; Double Glazing; standard glass; snap muntins; paint interior 2 cts; int. trim; caulk
8. Metal Clad; Double Glazing; standard glassE; snap muntins; paint interior 2 cts; int. trim; caulk
9. Wood; Triple Glazing-low E; snap muntins; paint int/ext 2 cts; int. trim; caulk
10. Solid Vinyl; Triple Glazing-low E; snap muntins; int. trim; caulk
11. Vinyl Clad; Triple Glazing-low E; snap muntins; paint interior 2 cts; int. trim; caulk
12. Metal Clad; Triple Glazing-low E; snap muntins; paint interior 2 cts; int. trim; caulk Exterior Window—Sliding
1. Wood; Double Glazing-low E; snap muntins; paint int/ext 2 cts; int. trim; caulk
2. Vinyl Clad; Double Glazing-low E; snap muntins; paint interior 2 cts; int. trim; caulk
3. Metal Clad; Double Glazing-low E; snap muntins; paint interior 2 cts; int. trim; caulk
4. Wood; Double Glazing; standard glass; snap muntins; paint int/ext 2 cts; int. trim; caulk
5. Vinyl Clad; Double Glazing; standard glass; snap muntins; paint interior 2 cts; int. trim; caulk
6. Metal Clad; Double Glazing; standard glass; snap muntins; paint interior 2 cts; int. trim; caulk
7. Wood; Triple Glazing-low E; snap muntins; paint int/ext 2 cts; int. trim; caulk
8. Vinyl Clad; Triple Glazing-low E; snap muntins; paint interior 2 cts; int. trim; caulk
9. Metal Clad; Triple Glazing-low E; snap muntins; paint interior 2 cts; int. trim; caulk Exterior Window—Bay
1. Wood Casement; Double Glazing-low E; snap muntins; paint int/ext 2 cts; int. trim; caulk
2. Vinyl Clad DH; Double Glazing-low E; snap muntins; paint interior 2 cts; int. trim; caulk
3. Metal Clad DH; Double Glazing-low E; snap muntins; paint interior 2 cts; int. trim; caulk
4. Wood Casement; Double Glazing; standard glass; snap muntins; paint int/ext 2 cts; int. trim; caulk
5. Vinyl Clad DH; Double Glazing; standard glass; snap muntins; paint interior 2 cts; int. trim; caulk
6. Metal Clad DH; Double Glazing; standard glass; snap muntins; paint interior 2 cts; int. trim; caulk
7. Wood; Triple Glazing-low E; snap muntins; paint int/ext 2 cts; int. trim; caulk
8. Vinyl Clad; Triple Glazing-low E; snap muntins; paint interior 2 cts; int. trim; caulk
9. Metal Clad; Triple Glazing-low E; snap muntins; paint interior 2 cts; int. trim; caulk Exterior Window—Fixed
1. Wood; Double Glazing-low E; snap muntins; paint int/ext 2 cts; int. trim; caulk
2. Solid Vinyl; Double Glazing-low E; snap muntins; int. trim; caulk
3. Vinyl Clad; Double Glazing-low E; snap muntins; paint interior 2 cts; int. trim; caulk
4. Metal Clad; Double Glazing-low E; snap muntins; paint interior 2 cts; int. trim; caulk
5. Wood; Double Glazing; standard glass; snap muntins; paint int/ext 2 cts; int. trim; caulk
6. Solid Vinyl; Double Glazing; standard glass; snap muntins; int. trim; caulk
7. Vinyl Clad; Double Glazing; standard glass; snap muntins; paint interior 2 cts; int. trim; caulk
8. Metal Clad; Double Glazing; standard glass; snap muntins; paint interior 2 cts; int. trim; caulk
9. Wood; Triple Glazing-low E; snap muntins; paint int/ext 2 cts; int. trim; caulk
10. Solid Vinyl; Triple Glazing-low E; snap muntins; int. trim; caulk
11. Vinyl Clad; Triple Glazing-low E; snap muntins; paint interior 2 cts; int. trim; caulk
12. Metal Clad; Triple Glazing-low E; snap muntins; paint interior 2 cts; int. trim; caulk Exterior Window—Egress
1. Not Used
2. Composite 4'-0"×4'-0; pour or frame in place; no step or cover
3. Composite 4'-0"×4'-0; pour in place; steel well/cover
4. Composite 4'-0"×4'-0; pour in place; reinforced fiberglass well w/steps and cover Exterior Shutters
1. Not Used
2. Polystyrene, louvered (ave 1'-6"×4'-6")
3. Polystyrene, solid raised panel (ave 1'-6"×4'-6")
4. Wood, louvered (ave 1'6"×4'-6"), primer, paint, 1 coat, 2 sides
5. Metal Security/Hurricane Shutters; Roll Shutter; Manual
6. Metal Security/Hurricane Shutters; Accordian Style Shutter; Manual
7. Metal Security/Hurricane Panels; Galvanized Steel Removeable Exterior Entry Door
1. 3' insul. Steel w/glass lites, prehung, hdwr, paint (2 cts)
2. 3' insul. Steel w/glass sidelight, prehung, hdwr, paint (2 cts)
3. Double, insul steel w/glass lites, prehung, hdwr, paint (2 cts)
4. 3' insul. Fiberglass w/glass lites, prehung, hdwr, paint or stain (2 coats)
5. 3' insul. Fiberglass w/glass lites, prehung, glass SIDELIGHTS, hdwr; paint or stain (2 coats)
6. Double 3'Fiberglass w/glass lites, prehung, NO sidelights, hdwr; paint or stain (2 coats)
7. 3'Fir, 1¾" thick prehung; 6 panel, prem. hdwr, paint (2 cts)
8. 3'Fir, 1¾" thick prehung; glass SIDELIGHTS; 6 panel, prem. hdwr, paint (2 cts)
9. 3' Solid wood (Custom), 1¾" thick; PREMIUM 6 panel, prem. hdwr, paint or stain 2 cts)
10. 3' Solid wood (Custom), 1¾" thick; PREMIUM w/glass sidelights; 6 panel, prem. hdwr, paint or stain (2 cts)
11. 3' Solid wood (Custom Mahogany), 1¾" thick; PREMIUM w/2 glass sidelights; raised panel, prem. hdwr, paint or stain (2 cts)

12 Double 3'Fir, 1¾" thick; 6 panel, prem. hdwr, paint (2 cts)
13 Double 3'Fir, 1¾" thick; glass sidelights; 6 pnl, prem. hdwr, paint or stain (2 cts)

Exterior Passage Door
1 3' insul. steel, embossed raised panel, prehung, hdwr, paint (2 cts)
2 3' insul. Fiberglass raised panel, prehung, hdwr, paint (2 cts)
3 3' Birch, prehung Flush solid core, 1¾" thick; hdwr, paint (2 cts)
4 3'Fir, prehung raised panel, 1¾" thick; prehung; hdwr, paint (2 cts)
5 3' steel/fiberglass with Glass, 1¾" thick; Prehung, hdwr, paint (2 cts)
6 "Bilco" steel basement egress door Exterior Doorwall
1 6' sliding; Wood; ⅝" tempered; int/ext casing; oak sill; paint (2 cts)
2 6'-Pair of 3'French Patio Atrium Doors; Wood; insulated, tempered; int/ext casing; oak sill; paint (2 cts)
3 8' sliding; Wood; ⅝" tempered; int/ext casing; oak sill; paint (2 cts)
4 12' sliding; Wood; ⅝" tempered; int/ext casing; oak sill; paint (2 cts)
5 6' sliding; Aluminum; ⅝" tempered; int/ext casing; oak sill; paint (2 cts)
6 8' sliding; Aluminum; ⅝" tempered; int/ext casing; oak sill; paint (2 cts)
7 12' sliding; Aluminum; ⅝" tempered; int/ext casing; oak sill; paint (2 cts)

Exterior Door—Garage 1 Car 1 Car Overhead Garage Door
1 19×7 sectional; Hardboard; frame; trim; weatherstrip; elec opener; paint
2 9×7 sectional; Metal (prefinished); frame; trim; weatherstrip; elec opener
3 9×7 sectional; Fiberglass; frame; trim; weatherstrip; elec opener; paint
4 9×7 sectional; Wood; frame; trim; weatherstrip; elec opener; paint
5 9×7 sectional; Custom Wood/Glass; frame; trim; weatherstrip; elec opener
6 9×8 sectional; Hardboard; frame; trim; weatherstrip; elec opener; paint
7 9×8 sectional; Metal (prefinished); frame; trim; weatherstrip; elec opener
8 9×8 sectional; Metal (prefinished); frame; trim; weatherstrip; NO opener
9 9×8 sectional; Fiberglass; frame; trim; weatherstrip; elec opener; paint
10 9×8 sectional-Premium; Custom Fiberglass; frame; trim; weatherstrip; elec opener; paint
11 9×8 sectional; Wood; frame; trim; weatherstrip; elec opener; paint
12 9×8 sectional-Premium; Custom Wood; frame; trim; weatherstrip; elec opener; paint Exterior Door—Garage 2 Car 2 Car Overhead Garage Door
1 16×7 sectional; Hardboard; frame; trim; weatherstrip; elec opener; paint
2 16×7 sectional; Metal (prefinished); frame; trim; weatherstrip; elec opener
3 16×7 sectional; Fiberglass; frame; trim; weatherstrip; elec opener; paint
4 16×7 sectional; Wood; frame; trim; weatherstrip; elec opener; paint
5 16×8 sectional; Hardboard; frame; trim; weatherstrip; elec opener; paint
6 16×8 sectional; Metal (prefinished); frame; trim; weatherstrip; elec opener
7 16×8 sectional; Fiberglass; frame; trim; weatherstrip; elec opener; paint
8 16×8 sectional-Premium; Custom Fiberglass; frame; trim; weatherstrip; elec opener; paint
9 16×8 sectional; Wood; frame; trim; weatherstrip; elec opener; paint
10 16×8 sectional-Premium; Custom Wood; frame; trim; weatherstrip; elec opener; paint Shingles—Asphalt 4-6 pitch
1 Asph, Std 210-235 #/sq; 15# felt; ice guard
2 Asph, Std Multi-layer, 240-260 #/sq; 15# felt; ice guard
3 Asph, Prem. Lamin. Multi-layer, 260-300 #/sq; 30# felt; ice guard
4 Asph, 50 Year Prem. Lamin. Multi-layer, 325#/sq min; 30# felt; ice guard Shingles—Wood 4-6 pitch
1 Red Cdr shing, #2 Grade; 18" L; 5½" exp; 30# felt; ice guard; breather backer
2 Red Cdr shing; 18" L; 5½" exp; 30# felt; ice guard; breather backer
3 Red Cdr hand split shakes; ¾"×18" L; 8½" exp; 30# felt; ice guard; breather backer
4 Red Cdr hand split shakes; ¾"×24" L; 10" exp; 30# felt; ice guard; breather backer
5 Fire Rtrdnt. Red Cdr shing, #2 Grade; 18" L; 5½" exp; 30# felt; ice guard; breather backer
6 Fire Rtrdnt, Red Cdr shing; 18" L; 5½" exp; 30# felt; ice guard; breather backer
7 Fire Rtrdnt, Red Cdr hand split shakes; ¾"×18" L; 8½" exp; 30# felt; ice guard; breather backer
8 Fire Rtrdnt, Red Cdr hand split shakes; ¾"×24" L; 10" exp; 30# felt; ice guard; breather backer Shingles—Slate 4-6 pitch
1 Slate, Vermont; semi-weathering; green/grey; copper nails; 30# felt; ice guard;
2 Slate, Pennsylvania, black; clear; copper nails; 30# felt; ice guard;
3 Slate, Buckingham, Va., black; 3/16"-1'4" thick; copper nails; 30# felt; ice guard;

Roof System Metal 4-6 pitch
1 Metal; Standing Seam; Kynar finish; ice guard
2 Metal; Embossed (simulated material); Kynar finish; ice guard
3 Copper, Standing Seam; 18 oz; ice guard
4 Copper, Batten Seam; 18 oz; ice guard Shingles—Asphalt 8-12 pitch
1 Asph, Std 210-235 #/sq; 15# felt; ice guard
2 Asph, Std Multi-layer, 240-260 #/sq; 15# felt; ice guard
3 Asph, Prem. Lamin. Multi-layer, 260-300 #/sq; 30# felt; ice guard
4 Asph, 50 Year Prem. Lamin. Multi-layer, 325#/sq min; 30# felt; ice guard Shingles—Wood 8-12 pitch
1 Red Cdr shing, #2 Grade; 18" L; 5½" exp; 30# felt; ice guard; breather backer
2 Red Cdr shing; 18" L; 5½" exp; 30# felt; ice guard; breather backer
3 Red Cdr hand split shakes; ¾"×18" L; 8½" exp; 30# felt; ice guard; breather backer 4 Red Cdr hand split shakes; ¾"×24" L; 10" exp; 30# felt; ice guard; breather backer
5 Fire Rtrdnt, Red Cdr shing, #2 Grade; 18" L; 5½" exp; 30# felt; ice guard; breather backer
6 Fire Rtrdnt, Red Cdr shing; 18" L; 5½" exp; 30# felt; ice guard; breather backer
7 Fire Rtrdnt, Red Cdr hand split shakes; ¾"×18" L; 8½" exp; 30# felt; ice guard; breather backer
8 Fire Rtrdnt, Red Cdr hand split shakes; ¾"×24" L; 10" exp; 30# felt; ice guard; breather backer Shingles—Slate 8-12 pitch
1 Slate, Vermont; semi-weathering; green/grey; copper nails; 30# felt; ice guard;
2 Slate, Pennsylvania, black; clear; copper nails; 30# felt; ice guard;
3 Slate, Buckingham, Va., black; 3/16"-1'4" thick; copper nails; 30# felt; ice guard;

Roof System Metal 8-12 pitch
1 Metal; Standing Seam; Kynar finish; ice guard
2 Metal; Embossed (simulated material); Kynar finish; ice guard
3 Copper, Standing Seam; 18 oz; ice guard
4 Copper, Batten Seam; 18 oz; ice guard Flat Roof
1 Built-Up Roof; smooth asphalt coat; 4 plies #15 felt, mopped; on nailable deck; 4×4 treated lumber cants; alum flashing 0.040" thick
2 Built-Up Roof w/2 layers 1" insul board; smooth asphalt coat; 4 plies #15 felt, mopped; on nailable deck; 4×4 treated lumber cants; alum flashing 0.040" thick
3 Elastomeric; EPDM plain; 45 mils; 4×4 treated lumber cants; alum flashing 0.040" thick
4 Elastomeric; EPDM plain; 45 mils; w/2 layers 1" insul board; 4×4 treated lumber cants; alum flashing 0.040" thick Roof Trim
1 Hip Roof: vent, drip edge, soffit, fascia
2 Gable Roof: vent, drip edge, soffit, fascia, painted 1×8 rake trim Gutter—Hip Roof System
1 Not Used
2 Gutter/downspouts, ALUMINUM, seamless, painted
3 Gutter—GALVANIZED 5", ½ round; downspouts 4", round
4 Gutter—16 oz. COPPER, 6", ½ round; downspouts 4", round Gutter—Gable Roof System
1 Not Used
2 Gutter/downspouts, ALUMINUM, seamless, painted
3 Gutter—GALVANIZED 5", ½ round; downspouts 4", round
4 Gutter-16 oz. COPPER, 6", ½ round; downspouts 4", round Dormer Trim
1 Drip edge; aluminum flashing, soffit/fascia, mil finish
2 Drip edge; COPPER flashing, 16 ounce; aluminum soffit/fascia, Roof Insulation
1 Ceiling insulation, +/−6", R19-R22; uninsulated rafters
2 Ceiling insulation, +/−9" fiberglass, R30; uninsulated rafters
3 Ceiling insulation, +/−12" fiberglass, R38; uninsulated rafters Skylight
1 Skylight; 2'×4'; operable; thermopane; framing; curb/flashing; inter trim
2 Skylight; 2'×4'; FIXED; thermopane; framing; curb/flashing; inter trim Roof Accessories
1 Cupola; stock pine; painted; 18" sq; 28" high; copper roof
2 Cupola; stock pine; painted; 30" sq; 37" high; copper roof
3 Cupola; CUSTOM, pine; painted; 48" sq; 72" high; copper roof
4 Weathervane/cupola; stock pine; painted; 18" sq; 28" high; copper roof
5 Weathervane/cupola; stock pine; painted; 30" sq; 37" high; copper roof Interior Partitions
1 2×4; 16"OC; single bottom plate; double top plate
2 2×4; 24"OC; single bottom plate; double top plate
3 2×6; 16"OC; single bottom plate; double top plate
4 2×6; 24"OC; single bottom plate; double top plate Railing
1 42" Pine balusters/railings (ave); skirtboard-primed/painted 1 coat
2 42" Pine balusters/Oak railings (ave); skirtboard-primed/painted 1 coat
3 42" Birch balusters/Oak railings (good); skirtboard-primed/painted 1 coat
4 42" Birch balusters/Oak railings (good); skirtboard-stain, sand, seal varnish 2 coats Basement Partitions
1 Not Used
2 2×4; 16"OC; single bottom plate; double top plate
3 2×4; 24"OC; single bottom plate; double top plate
4 2×6; 16"OC; single bottom plate; double top plate
5 2×6; 24"OC; single bottom plate; double top plate Interior Wall
1 No Finish
2 ½" gyp bd; taped & sanded; unfinished
3 ½" gyp bd-Water Resistant; taped & sanded; unfinished
4 ⅝" gyp bd; taped & sanded; unfinished
5 Thincoat plaster on ½" backer; corners taped & sanded; unfinished
6 MDF "beadboard" over gyp bd wall; painted 2 coats with wood trim cap Interior Wall Finish
1 No Finish
2 Paint; oil base primer; NO FINISH PAINT
3 Paint; primer; 2 finish coats Interior Ceiling
1 No Finish
2 ½" gyp bd; taped & sanded; unfinished
3 ½" gyp bd-Water Resistant; taped & sanded; unfinished
4 ⅝" gyp bd; taped & sanded; unfinished
5 1¼" gyp bd; taped & sanded; unfinished (Garage w/Living Area above)
6 Thincoat plaster on ½" backer; corners taped & sanded; unfinished
7 2×2 or 2×4; acoustic ceiling system Interior Ceiling Finish
1 No Finish
2 Paint; oil base primer; NO FINISH PAINT
3 Paint; primer; 2 finish coats
4 Paint; primer; 2 step "knock down" textured finish Flooring
1 No Finish
2 Concrete sealer (Rez-Seal); 14% solids; clear
3 Carpet; light duty; 22 oz Olefin; felt pad
4 Carpet; medium duty; 36 oz Nylon; rubber pad
5 Carpet; medium plush; 42 oz Nylon; rubber pad
6 Carpet; premium 50 oz tufted wool berber; premium pad
7 Vinyl Composition Tile (VCT); 1/8" thick, marbelized
8 Vinyl sheet goods; 0.125" thick
9 Plastic Laminate Strip Flooring; 8-10 mm; foam underlayment; floating flr system
10 Engineered Wood Strip; prefinished; floating floor system
11 Wood strip; prefinished white oak; 2¼" wide
12 Wood strip; prefinished Maple; 2¼" wide
13 Wood plank; prefinished character grade Hickory; 3"-5" wide
14 Ceramic tile; glazed 12"×12"; floor application; thin set
15 Ceramic tile; glazed 12"×12"; floor MUD SET
16 Ceramic tile; glazed 8"×8"; floor application; thin set
17 Epoxy floor coating; 1 coat clear Garage Floor
1 No Finish
2 Concrete sealer; 14% solids; clear
3 Concrete sealer; 30% solids; clear
4 Epoxy floor coating; 1 coat clear Special Wall Finish
1 Vinyl wallcovering, light duty, 15 oz, prime wall, sizing
2 Wallpaper, prime wall, sizing, average quality
3 Dry area ceramic tile; thinset
4 Wet area ceramic tile; cementious backer bd; credit gyp bd
5 Wet area Premium tile; cementious backer bd; credit gyp bd
6 Wood wainscot
7 Wood raised panel system ¾"; oak veneer; stain/finish
8 Wood raised panel system ¾"; cherry veneer; stain/finish
9 Not Used Special Floor Finish
1 Painted plywood floor
2 Vinyl sheet goods; 0.125" thick
3 Linoleum Sheet Goods; 79" wide roll;
4 Plastic Laminate Strip Flooring; 8-10 mm; foam underlayment; floating flr system
5 Wood Veneer Composition Strip; floating floor system
6 Wood strip; prefinished white oak; 2¼" wide
7 Wood strip; prefinished Brazilian Cherry; 2¼" wide
8 Wood strip; prefinished Maple; 2¼" wide
9 Wood plank; prefinished character grade Hickory; 3"-5" wide
10 Wood strip; prefinished PREMIUM HARDWOOD; 2¼" wide
11 Ceramic tile; glazed 8"×8"; floor application; thin set
12 Ceramic tile; glazed 12"×12"; floor application; thin set
13 Ceramic tile; glazed 12"×12"; floor MUD SET
14 Premium ceramic tile or special install; glazed 12"×12"; floor application; thin set
15 Premium MARBLE tile 12×12"×3/8"; floor application; thin set
16 Wet area ceramic tile; floor application; cementious backer bd
17 Carpet; medium duty; 36 oz Nylon; rubber pad
18 Carpet; medium plush; 42 oz Nylon; rubber pad
19 Carpet; premium 50 oz tufted wool berber; premium pad
20 Quarry Tile; 6×6; ½" thick; mud set
21 Slate; 12"×12"×¼"; thin set
22 Bluestone; snapped random rectangular; mud set Interior Doors
1 2'-8" door (1-3/8"); prehung flush hollow core birch; trim painted; chrome hinges; lockset; paint 2 coats
2 2'-8" door (1-3/8"); prehung hollow core; econ. raised panel; embossed, molded hdbd; trim painted; lockset; paint 2 coats
3 2'-8" door; (1-3/8"); prehung raised panel; painted MDF (Medium Density Fiber); trim painted; lockset; paint 2 coats
4 2'-8" door; (1-3/8"); prehung raised 6 panel solid pine; trim painted; lockset; paint 2 coats
5 2'-8" door; (1-3/8"); prehung raised panel VENEER Oak, lumber core; oak trim; bronze hinges; lockset upgrade; varnish 3 coats
6 2'-8" door; (1-3/8"); prehung raised panel VENEER Cherry, lumber core; hardwood trim; bronze hinges; lockset upgrade; varnish 3 coats
7 2'-8" door; (1-¾"); CUSTOM raised panel SOLID Cherry; cherry trim; bronze hinges; premium lockset; varnish 3 coats
8 2'-6" French door; (1-3/8"); pine; 15 lites; trim painted; hinges; lockset; paint 2 coat Window Casing
1 Standard Default—No Premium (2½" Pine FJ, Primed, Painted 2 coats)
2 CREDIT (2½" Pine FJ, PRIMER ONLY)
3 Pine; 3¼", PRIMER ONLY
4 Pine; Premium 3¼", Primed, Painted 2 coats
5 Hardwood (e.g., Birch)—(2½" Wood, Primed, Painted 2 coats)
6 Hardwood (e.g., Oak)—(2½" Wood, Stained, Varnished)

Door Casing
1 Standard Default—No Premium (2½" Pine FJ, Primed, Painted 2 coats)
2 CREDIT (2½" Pine FJ, PRIMER ONLY)
3 Pine; 3¼", PRIMER ONLY
4 Pine; Premium 3¼", Primed, Painted 2 coats
5 Hardwood (e.g., Birch)—(2½" Wood, Primed, Painted 2 coats)
6 Hardwood (e.g., Oak)—(2½" Wood, Stained, Varnished)

Base
1 Base; stock Pine; 3½"; painted 2 coats
2 Base; Pine FJ; PREPRIMED ONLY; 4¼"
3 Base; Pine; Premium 5¼"; painted 2 coats
4 Base; Pine; Premium 5¼"; PRIMED ONLY
5 Base; high density polymer; PREPRIMED ONLY; 3 13/16"
6 Base; high density polymer; 3 13/16"; painted 1 coat
7 Base; birch; 3½"; painted 2 coats
8 Base; oak or birch; 3½"; varnish 1 coat+sealer
9 Base+shoe mold; oak or birch; 3½"; varnish 1 coat+sealer
10 Not Used Crown
1 Cove; stock pine; 1¾"; painted 2 coats
2 Cove; oak or birch; 1¾"; varnish 1 coat+sealer
3 Cove; oak or birch; 2¾"; varnish 1 coat+sealer
4 Cove; high density polymer; 3¾"; painted 1 coat
5 Crown; stock pine; 3 5/8"; painted 2 coats
6 Crown; stock pine; 4 5/8"; painted 2 coats
7 Crown; high density polymer; 3 13/16"; painted 1 coat
8 Not Used Shower Enclosure
1 Shower tempered glass doors; alum. frame
2 Tub/shower tempered glass doors; alum. frame
3 Glass shower enclosure; tempered; 2 panel & door 4 Tiled shower wall surround, and ceiling; tempered glass door
5 Glass block shower walls (2-3); premium tilework; tiled ceiling; tempered glass door Bath Accessories
1 Medicine cabinet w/mirror, wood frame; towel bar; robe hooks
2 Medicine cabinet w/mirror; premium, wood frame; towel bar; robe hooks Decorative Column
1 Fir; stock unit; hollow round 8" diam; painted
2 Fir; stock unit; hollow round 10" diam; painted Kitchen Cabinets
1 Base/upper cabs; pressed wood painted/melamine finish; ave qual
2 Base/upper cabs; hardwood doors & face; melamine box; good qual
3 Base/upper cabs; hardwood doors, face & box; excellent qual; dovetailed
4 Base/upper cabs; cherry/maple doors, face & box; premier quality; dovetailed Counter
1 Plastic laminate; economy grade w/backsplash
2 Plastic laminate; custom w/backsplash; excellent quality
3 Wet area ceramic tile; ½" CDX base; cementious backer bd
4 Wet area Premium tile; ½" CDX base; cementious backer bd
5 Cultured (synthetic) Marble; Sink BOWL & TOP; 4" faucet drillings
6 Corian™ "In the Box"; Sink BOWL & TOP; 4" faucet drillings
7 Maple, solid laminated, 1½" thick; w/square splash
8 Stainless steel; w/backsplash
9 Marble; no backsplash
10 Solid Polymer (e.g., Corian™)
11 Soapstone; no backsplash
12 Concrete; no backsplash
13 Quartz Resin Surface
14 Granite; no backsplash Bath Vanity
1 Vanity base 36"; builders standard
2 Vanity base 36"; hardwood doors, face, melamine box; good qual
3 Vanity base 36"; hardwood doors, face & box; excellent qual; dovetailed
4 Vanity base 36"; hardwood doors, face & box; premier qual; dovetailed
5 Vanity base 48"; builders standard
6 Vanity base 48"; hardwood doors, face, melamine box; good qual
7 Vanity base 48"; hardwood doors, face & box; excellent qual; dovetailed
8 Vanity base 48"; hardwood doors, face & box; premier qual; dovetailed
9 Vanity base 60"; builders standard
10 Vanity base 60"; hardwood doors, face, melamine box; good qual
11 Vanity base 60"; hardwood doors, face & box; excellent qual; dovetailed
12 Vanity base 60"; hardwood doors, face & box; premier qual; dovetailed Backsplash
1 No Premium Finish; Assume 'typical' selection above"
2 Wet area ceramic tile; cementious backer bd; credit gyp bd
3 Wet area Premium tile; cementious backer bd; credit gyp bd
4 Mirror; unframed; polished edges; laminated
5 Quartz Resin Surface
6 Granite Elevator
1 Not Used
2 Residential, cab type; 1 floor/2 stops
3 Residential, cab type; 2 floor/3 stops
4 Residential, cab type; 3 floor/4 stops Plumbing
1 Meter; supply branches (copper)/waste mains (sched 40 PVC); backflow preventer valves (4 test cocks)

Vanity
1 Faucet, supply/vent only (Used with INTEGRAL sink/top combo)
2 Vanity sink, faucet, supply/vent; porcelain or solid polymer (Corian™)
3 Pedestal Sink; faucets, centerset; supply/vent
4 Pedestal Sink (Premium); faucets, centerset; supply/vent Water Closet
1 Water closet; vitreous china; rough, supply, vent
2 Water closet; elongated bowl; vitreous china; rough, supply, vent
3 Water closet (Prem); vitreous china; color; rough, supply, vent
4 Bidet; vitreous china; trim; rough, supply, vent Tub
1 Tub; enameled formed steel; 60"×34"; faucet, diverter spout combo
2 Tub; porcelain enamel on cast iron; 60"×36"; faucet, diverter spout combo
3 Tub; porcelain enamel on cast iron; 72"×36"; premium faucet, diverter spout combo
4 Tub-corner; porcelain enamel on cast iron; 48"×44"; premium faucet, diverter spout combo
5 Molded fiberglass tub w/shower surround; 60"×34"×76" high; faucet, diverter spout combo
6 Fiberglass shower; 36"×36"; thermostatic mix valve; rough, supply/vent
7 Whirlpool bath; molded fiberglass; 72"×36"×24"; premium faucet, diverter spout combo
8 Whirlpool bath (large); molded fiberglass; 72"×42"×24"; premium faucet, diverter spout combo Shower
1 Not Used
2 Tiled shower receptor 36"; thermostatic mix valve; rough, supply/vent
3 Tiled shower receptor 48"; thermostatic mix valve; rough, supply/vent Kitchen Sink
1 Kitch sink, 1 bowl, economy, pntd steel, ½ HP disposal, faucet w/spray
2 Kitch sink, 1 bowl, economy Stainless, ½ HP disp, faucet w/spray
3 Kitch sink, 1 bowl, Stainless, faucet/spray, ¾ HP disposal
4 Kitch sink, 2 bowl, Stainless, faucet/spray, ¾ HP disposal
5 Kitch sink, 2 bowl, Stainless, faucet/spray, No Disposal
6 Kitch sink, 2 bowl, Solid Polymer, faucet/spray, ¾ HP disposal 6 Kitch sink, 1 bowl, Stainless, Premium faucet/spray, ¾ HP disposal
7 Kitch sink, 2 bowl, Stainless, Premium faucet/spray, ¾ HP disposal
8 Kitch sink, 2 bowl, Solid Polymer, Premium faucet/spray, ¾ HP disposal
9 Kitch sink, 2 bowl, Weathered Copper, Premium faucet/spray, ¾ HP disposal
8 Kitch sink, 1 bowl, premium sink, faucet/spray, ¾ HP disposal
9 Kitch sink, 1 bowl, premium sink, Premium faucet/spray, ¾ HP disposal
10 Kitch sink, 1 bowl, Soapstone Sink, Premium faucet/spray, ¾ HP disposal Ancillary Sink
1 Sink, Stainless, faucet
2 Sink, Stainless, faucet, ½ HP disposal
3 Sink, Stainless, Premium faucet, ½ HP disposal
4 Sink, cast iron/enamel or corian, faucet
5 Bar Sink, Stainless, faucet
6 Bar Sink, Stainless, Premium faucet
7 Bar Sink, cast iron/enamel or corian, faucet Service
1 Laundry sink 24×20; high density plastic/legs; faucet
2 Laundry sink 24×20; porcelain enamel; faucet
3 Laundry sink; double tub 24×40; high density plastic/legs; faucet
4 Sink, Stainless, faucet; 36" base cab w/Plastic Lam Counter
5 Sink, Stainless, faucet; 72" base cab w/Plastic Lam Counter Special Plumbing
1 Not Used
2 Some special plumbing
3 Limited Reverse Osmosis water filtration system
4 Whole House Reverse Osmosis water filtration system
5 Garage: Plastic crock floor drain with 10' drain tile
6 Garage: Catch basin; oil/water interceptor, steel 15 GPM
7 Hot Tub System—6' Dia×4' Deep
8 Hot Tub System—8' Dia×4' Deep Hot Water Heater
1 HWH, Gas 40 Gal; glass lined; w/vent
2 HWH, Gas 50 Gal; glass lined; w/vent
3 HWH, Gas 75 Gal; glass lined; w/vent
4 HWH, Elec 40 Gal; glass lined; dbl element
5 HWH, Elec 52 Gal; glass lined; dbl element
6 HWH, Elec 80 Gal; glass lined; dbl element
7 Tankless elec; whole house on demand 22 KWH (dedicated 100 A ckt)

Water Softener
1 Not Used
2 Water Softener, automatic, 30-50 grains/gallon
3 Water Softener, automatic, 100-150 grains/gallon
4 Physical Water Treatment/Filtration; 40 micron; 6-8 gpm Deck
1 Wd deck; press. treated; joists 16"OC, girder, posts, stair
2 Wd deck (complex/prem.); press. treated; joists 16"OC, girder, posts, stair
3 Wood Polymer deck; press trtd joists 16"OC, girder, posts, stair
4 Wood Polymer deck (complex/prem.); press trtd joists 16"OC, girder, posts, stair
5 Wd deck; cedar or redwood; joists 16"OC, girder, posts, stair
6 Wd deck (complex/prem.); cedar or redwood; joists 16"OC, girder, posts, stair Furnace
1 Gas forced air; heat only; 100 MBH; fiberglass supply ducts
2 Gas forced air; heat only; 100 MBH; sheet metal/insul main supply ducts
3 Gas forced air; Heating/AC 100 MBH/36 MBH; fiberglass supply ducts
4 Gas forced air; Heating/AC 1100 MBH/36 MBH; sheet metal/insul main supply ducts
5 Electric Boiler—Hydronic; heat only; 100 MBH
6 Gas Boiler—Hydronic; heat only; 100 MBH
7 Oil Fired Boiler—Hydronic; heat only; 100 MBH
8 Gas Boiler—Hydronic; heat 100 MBH; Cool 36 MBH; sheet metal/insul main supply ducts
9 Oil Fired Boiler—Hydronic; heat 100 MBH; Cool 36 MBH; sheet metal/insul main supply ducts
10 Electric Heat/AC; 2@ 34 MBH Heat/3-4 ton Cool; sheet metal/insul main supply ducts
11 Electric Heat/AC; 34 MBH Heat/3-4 ton Cool; sheet metal/insul main supply ducts Furnace
1 Gas forced air; heat only; 120 MBH; fiberglass supply ducts
2 Gas forced air; heat only; 120 MBH; sheet metal/insul main supply ducts
3 Gas forced air; Heating/AC 120 MBH/42 MBH; fiberglass supply ducts
4 Gas forced air; Heating/AC 120 MBH/42 MBH; sheet metal/insul main supply ducts
5 Gas Boiler—Hydronic; heat only; 120 MBH
6 Oil Fired Boiler—Hydronic; heat only; 120 MBH
7 Gas Boiler—Hydronic; heat 120 MBH; Cool 42 MBH; sheet metal/insul main supply ducts
8 Oil Fired Boiler—Hydronic; heat 120 MBH; Cool 36 MBH; sheet metal/insul main supply ducts Furnace
1 Gas forced air; heat only; 160 MBH; fiberglass supply ducts
2 Gas forced air; heat only; 160 MBH; sheet metal/insul main supply ducts
3 Gas forced air; Heating/AC 144 MBH/47 MBH; fiberglass supply ducts
4 Gas forced air; Heating/AC 144 MBH/47 MBH; sheet metal/insul main supply ducts
5 Gas Boiler—Hydronic; heat only; 150 MBH
6 Oil Fired Boiler—Hydronic; heat only; 120 MBH
7 Gas Boiler—Hydronic; heat 120 MBH; Cool 42 MBH; sheet metal/insul main supply ducts
8 Oil Fired Boiler—Hydronic; heat 120 MBH; Cool 36 MBH; sheet metal/insul main supply ducts Furnace
1 Gas forced air; heat only; 200 MBH; fiberglass supply ducts
2 Gas forced air; heat only; 200 MBH; sheet metal/insul main supply ducts
3 Gas forced air; Heating/AC 200 MBH/60 MBH; fiberglass supply ducts
4 Gas forced air; Heating/AC 200 MBH/60 MBH; sheet metal/insul main supply ducts
5 Gas Boiler—Hydronic; heat only; 200 MBH
6 Oil Fired Boiler—Hydronic; heat only; 200 MBH
7 Gas Boiler—Hydronic; heat 200 MBH; Cool 60 MBH; sheet metal/insul main supply ducts 8 Oil Fired Boiler—Hydronic; heat 200 MBH; Cool 60 MBH; sheet metal/insul main supply ducts Fireplace
1 Not Used
2 Wood burning stove
3 Gas insert/direct vent; drywall surround; flush hearth; wood mantle
4 Gas insert/direct vent; Cast Stone surround; raised hearth; wood mantle
5 Metal fireplace box; SS flue; limited Cast Stone or brick surround/hearth; wood mantle
6 Metal fireplace box; SS flue; Cast Stone surround/interior chimney face; wood mantle
7 Masonry w/fndtn, brick firebox 30×29; brick hearth/surround; SS flue; wood mantle
8 Masonry w/fdtn, brick firebox 30×29; tall Cast Stone surround; chimney; wood mantle
9 Large Custom Masonry w/fdtn, Full Height Cast Stone Surround; brick firebox 30×29; stone hearth, wood mantle
10 Large Custom Stone w/fdtn, brick firebox 30×29; stone hearth, surround, chimney; wood mantle
11 2-Metal fireplace boxes; shared chimney; brick hearth/surround; SS flues; wood mantle
12 2-Masonry (shared) w/fndtn, brick firebox 30×29; brick hearth/surround; SS flues; wood mantle
13 2-Masonry (shared) w/fdtn, brick firebox 30×29; tall Cast Stone surround; chimney; wood mantle
14 3-Masonry (shared) w/fdtn, brick fireboxes 30×29; tall Cast Stone surround; chimney; wood mantle
15 Lg Custom Stone w/fdtn, 2 brick fireboxes 30×29; shared stone chimney; stone hearth, surround, chimney; wood mantle
16 Lg Custom Stone w/fdtn; 3 brick fireboxes 30×29; shared stone chimney, stone hearth/surround; wood mantle Special HVAC
1 Mech Ventilation w/Air to Air Heat Exchgr (AAUX)—low
2 Mech Ventilation w/Air to Air Heat Exchgr (AAUX)—ave
3 Mech Ventilation w/Air to Air Heat Exchgr (AAUX)—prem
4 Not Used Garage Heat
1 Not Used
2 Electric wall heater; 4000 W; 240 V; 20 A
3 Gas Fired Unit Heater; fan; 20,000 BTU
4 Gas Fired Infra-Red Unit Heater; electric ignition; 15,000 BTU Electrical Service
1 100 A; 120/240V; 1 ph; 3 wire; panel bd w/breakers; cable service entrance
2 100 A; 120/240V; 1 ph; 3 wire; panel bd. wbreakers; conduit service entrance; meter socket;
3 150 A; 120/240V; 1 ph; 3 wire; panel bd w/breakers; cable service entrance
4 150 A; 120/240V; 1 ph; 3 wire; panel bd w/breakers; conduit service entrance; meter socket;
5 200 A; 120/240V; 1 ph; 3 wire; panel bd w/breakers; cable service entrance
6 200 A; 120/240V; 1 ph; 3 wire; panel bd w/breakers; conduit service entrance; meter socket;
7 400 A; 120/240V; 1 ph; 3 wire; panel bd w/breakers; service entrance Electrical Distribution
1 Romex wiring; service lighting; switches/receptacles
2 Romex wiring; service lighting; "Designer" switches/receptacles
3 Romex wiring; service lighting; intercom; "Designer" switches/receptacles Lighting
1 No Fixed Lighting
2 Minor fixed/recessed lighting
3 Average fixed/recessed lighting
4 Extensive fixed/cove/recessed/down lighting
5 Custom lighting; extensive fixed/cove/recessed/down lighting Lighting—Basement
1 No Fixed Lighting
2 Utility (1 pull chain incandescent per 150 SF)
3 Minor fixed/recessed lighting
4 Average fixed/recessed lighting Special Electric
1 No Special Electrical
2 Security/Smoke Detection System
3 Smoke Detection System Only
4 Broadband (Cat SE) pre-wire (assume 10 drops)
5 Combo Cable Pre-wire (10 drops)—(2-Cat SE; 3 Coax; 2 HD Coax; 1 Cat 3; 1 control wire for touch screen)
6 Whole Home Automation System—Average thermostat, ltg/security controls
7 Whole Home Automation System—Above Ave thermostat, ltg/security controls
8 Lightning Protection
9 Not Used General Conditions
1 (Low): Temporary utilities, insurance; surveys, permits, cleaning, misc
2 (Average) Temporary utilities, insurance; surveys, permits, cleaning, misc
3 Difficult site access/laydown; temp utilities, insurance; surveys, permits, cleaning, misc
4 Winter conditions, temp utilities, insurance; surveys, permits, cleaning, misc
5 Difficult access; winter conditions, temp utilities, insurance; surveys, permits, cleaning, misc
6 Very difficult site access/laydown; temp utilities, insurance; surveys, permits, cleaning, misc Drafting
1 Not Used
2 Architectural drafting services (limited)
3 Architectural drafting services; engineering
4 Architectural drafting services; engineering
5 Architectural drafting services; engineering
6 Architectural drafting services; engineering Site Supervision
1 Not Used
2 Full Time Contractor site supervision; 5 months
3 Full Time Contractor site supervision; 6 months
4 Full Time Contractor site supervision; 7 months
5 Full Time Contractor site supervision; 8 months
6 Full Time Contractor site supervision; 9 months
7 PART TIME Contractor site supervision; 5 months
8 PART TIME Contractor site supervision; 6 months
9 PART TIME Contractor site supervision; 7 months
10 PART TIME Contractor site supervision; 8 months
11 PART TIME Contractor site supervision; 9 months General Contractor Profit
1 Level 1: 1%
2 Level 2: 5%
3 Level 3: 6%
4 Level 4: 7%
5 Level 5: 8%
6 Level 6: 9%
7 Level 7: 10%
8 Level 8: 12%
9 Level 9: 15%
10 Level 10: 20%

Range
1 30" Range/oven; gas or electric; freestanding; economy
2 30" Range/oven; gas or electric; free standing
3 30" Double Oven, gas or electric; built in; Stainless
4 30" Range/oven; gas/elec (dual fuel); free standing
5 30" Range/oven; gas/elec (dual fuel); free standing; Premium
6 36" Range/oven; gas/elec (dual fuel); free standing
7 36" Range/oven; gas/elec (dual fuel); free standing; Premium
8 36" Commercial range/oven; gas/elec (dual fuel); free standing
9 48" Range/oven; gas/elec (dual fuel); free standing; Premium
10 60" Commercial Range/oven; gas; free standing; Premium Warming Drawer
1 Warming Drawer; Stainless
2 Not Used Hood
1 30" exhaust hood; economy; exterior vented
2 36" exhaust hood; exterior vented
3 36" exhaust hood; Premium; exterior vented; 600 CFM
4 36" exhaust hood; Premium; stainless; exterior vented; 600 CFM
5 42" exhaust hood; exterior vented
6 42" exhaust hood; Premium; exterior vented; 600 CFM
7 36"-42" exhaust hood; Premium; stainless; exterior vented; 600 CFM
8 48-60" custom exhaust hood; stainless; exterior vented; 600-1000 CFM Dropin
1 30" Cooktop; gas or electric; drop-in
2 30" Cooktop; gas; drop-in; Premium
3 36" Cooktop; gas or electric; drop-in
4 36" Cooktop; gas; drop-in; Premium
5 36" Commercial cooktop; gas; drop-in Dishwasher
1 24" dishwasher; built-in; economy
2 24" dishwasher; built-in; 4+cycles
3 24" dishwasher; built-in; 4+cycles; stainless interior; Premium
4 24" dishwasher; 2 drawer; built-in; 4+cycles; stainless interior; Premium Refrigerator
1 30" Refrigerator/freezer; standard; economy
2 30" Refrigerator/freezer; Premium
3 36" Refrigerator/freezer; standard
4 36" Refrigerator/freezer/icemaker; 24" depth
5 36" Refrigerator/freezer/icemaker; 24" depth; Premium
6 36" Commercial refrigerator/freezer/icemaker; 24" depth
7 42" Refrigerator/freezer/icemaker; 24" depth; Premium
8 48" Refrigerator/freezer/icemaker or Freezer; 24" depth; Premium
9 36" Wine Cooler; stainless/glass; Premium Undercounter Refrigerator
1 24" Undercounter refrigerator
2 24" Undercounter refrigerator; Premium
3 24" Undercounter wine cooler; stainless Microwave
1 24" Microwave oven; built-in
2 24" Microwave oven; built-in; Premium
3 30" Microwave; over range Garbage Compactor
1 Garbage Compactor; Stainless
2 Not Used Washer/Dryer
1 Washing machine; Dryer; Standard
2 Washing machine; Dryer; Premium
3 Stacking washing machine; Dryer
4 Stacking washing machine; Dryer; Premium Window Treatment
1 Not Used
2 Horizontal 1" mini blinds; color; economy
3 Horizontal 1" mini blinds; color; average
4 Horizontal 1" mini blinds; color; premium
5 Vertical blinds; 3" to 5" cloth strips; economy
6 Vertical blinds; 3" to 5" cloth strips; average
7 Vertical blinds; 3" to 5" cloth strips; premium
8 Wood fixed louver; stock units Closet
1 Not Used
2 Allowance: Wire (vinyl coated) basket storage/shelving; hanger tracks
3 Allowance: Melamine storage/shelving; vinyl coated wire hanger tracks
4 Allowance: Wood (custom) storage/shelving; metal closet rods
5 Plywood, ¾" thick with lumber edge, 12" deep; 4 shelves @ 6' long
6 Plywood, ¾" thick with lumber edge, 12" deep; 4 shelves @ 10' long Sauna
1 Not Used
2 Sauna; prefab; 7' high; 6'×4' cedar; heater and controls
3 Sauna; prefab; 7' high; 6'×6' cedar; heater and controls
4 Sauna; prefab; 7' high; 6'×9' cedar; heater and controls
5 Sauna; prefab; 7' high; 8'×10' cedar; heater and controls Other
1 Not Used
2 Central Vacuum System (Rough-In Only)
3 Central Vacuum System Sitework Grubbing
1 Not Required
2 Light brush removal
3 Cut & chip light (trees to 6" dia); grub stumps & remove
4 Cut & chip medium (trees to 12" dia); grub stumps & remove
5 Cut & chip heavy (trees to 24" dia); grub stumps & remove
6 Cut & burn light (trees to 6" dia); grub stumps & remove
7 Cut & burn medium (trees to 12" dia); grub stumps & remove 8 Cut & burn heavy (trees to 24" dia); grub stumps & remove Grade
1 Not Used
2 Minimal rough/fine grade; no compaction
3 Moderate rough/fine grade; no compaction Road
1 Not Used
2 ¾" stone compacted to 9" deep
3 ¾" stone compacted to 12" deep
4 Crushed 1½" stone; compacted to 4" deep (light duty)
5 Crushed 1½" stone; compacted to 8" deep
6 Crushed 1½" stone; compacted to 12" deep
7 Asphalt; 6" r.o.b. gravel base; 2" binder course; 1" topping
8 Conc. 3500 psi; 4" thick; broom finish; 6×6 WWF; 6" crushed stone base
9 Conc. 3500 psi; 5" thick; broom finish; 6×6 WWF; 6" crushed stone base Drive
1 Not Used
2 Crushed 1½" stone; compacted to 8" deep
3 Asphalt; 6" r.o.b. gravel base; 2" binder course; 1" topping
4 ¾" stone compacted to 9" deep
5 Conc. 3500 psi; 5" thick; broom finish; 6×6 WWF; 6" crushed stone base
6 Conc. 3500 psi; 6" thick; broom finish; 6×6 WWF; 6" crushed stone base
7 Stamped Concrete/2 colors; 3500 psi; 4" thick; 6×6 WWF; 4" r.o.b. grvl
8 Uni-Lock conc pavers; 1" sand bed; 8" crushed stone base
9 Brick paving; 4"×8"×1½"; ⅜" grout joints; asph. bedding; 4" conc base; 4" r.o.b. grvl
10 Granite blocks; 3½"×3½"×3½"; grouted; 1" mortar bedding; 4" r.o.b. grvl Walk
1 Not Used
2 Crushed 1½" stone; compacted to 4"-6" deep
3 Asphalt; 4" r.o.b. gravel base; 1" binder course; 1" topping
4 Conc. 3500 psi; 4" thick; broom finish; 6×6 WWF; 4" r.o.b. grvl
5 Stamped Concrete/2 colors; 3500 psi; 4" thick; 6×6 WWF; 4" r.o.b. grvl
6 Uni-Lock conc pavers; 1" sand bed; 6" crushed stone base
7 Brick paving; 4"×8"×1½" without joints; 1" sand bed; 6" crushed stone base
8 Brick paving; 4"×8"×1½"; ⅜" grout joints; asph. bedding; 4" conc base; 4" r.o.b. grvl
9 Flagstone paving (irreg shape); 1" thick; 1" sand bed; 6" crushed stone base
10 Flagstone; irregular; 1" thick; grouted; 1" mortar bedding; 4" conc base; 4" r.o.b. grvl
11 Flagstone; regular; 1" thick; grouted; 1" mortar bedding; 4" conc base; 4" r.o.b. grvl Retaining Wall
1 Not Used
2 4' high; reinf. Concrete retaining wall; inc excav, backfill, reinf
3 6' high; reinf. Concrete retaining wall; inc excav, backfill, reinf
4 8' high; reinf. Concrete retaining wall; inc excav, backfill, reinf
5 Decorative random stone low wall, sloping earth holdback; no foundation
6 Decorative random stone wall (to 6' high); 18" thick; dry or mortar set
7 Cut stone wall (to 6' high); 18" thick; dry or mortar set Porch
1 Wood Deck Porch Floor (See 122.60 system)
2 Conc. 3500 psi; 4" thick; broom finish; 6×6 WWF; 4" r.o.b. grvl
3 Stamped Concrete/2 colors; 3500 psi; 4" thick; 6×6 WWF; 4" r.o.b. grvl
4 Wood (on sleepers), Primer+2 finish coats, 4" conc. Base; 4" r.o.b. gravel
5 Brick; 4"×8"×1½"; ⅜" groutjoints; 1" mortar bedding; 4" conc base; 4" r.o.b. grvl
6 Flagstone; irregular; 1" thick; grouted; 1" mortar bedding; 4" conc base; 4" r.o.b. grvl
7 Wood/sleepers OVER FLAT ROOF, Prime+2 finish coats
8 Wood, 2×10 (16'), 16"OC; bridging; furring; box sills; girder/lally; ¾" T&G OSB subflr
9 Comp. "1" joist, 9.5" (15'), 16"OC; bridging; box sills; girder/lally, ¾' T&G OSB subflr
10 Trussjoist, 12" (21'), 16"OC; furring; girder/lally; ¾" T&G OSB subflr Porch Roof Deck
1 2×8 rafters; 16"OC; ½" CDX sheathing; Wood beaded ceiling; Primed+2 coats
2 2×8 rafters; 16"OC; ½" CDX sheathing; Cedar beaded ceiling; stained+Varnished
3 3" thick T&G roof deck (stained/sealed) on Timber Frame Porch Frame
1 Glu-Lam (LVL); clad; Dimensional posts; cedar clad
2 Glu-Lam (LVL); w/stone base; Dimensional posts; cedar clad
3 Timber Frame (simple)
4 Timber Frame (w/curved braces)
5 Feature Timber Frame (w/curved braces)
6 Timber w/stone base
7 Feature Timber Frame w/stone base Irrigation
1 Not Used
2 Sprinkler irrigation system; custom; 1" supply; average zone coverage
3 Sprinkler irrigation system; custom; 1½" supply; above average zone coverage Lawn
1 Not Used
2 Seed; mechanically applied; 215 lb/acre
3 Hydroseed; includes seed and fertilizer
4 Sod; 1" deep; bluegrass Landscape
1 Not Used
2 Minimal allowance; shrubs, bushes; no trees
3 Modest allowance; shrubs, bushes; no trees
4 Average allowance; shrubs, bushes; some small caliper trees <3"
5 Above average allowance; shrubs, bushes; some small caliper trees <3"
6 Extensive allowance; shrubs, bushes; mix of trees; small and large caliper Gas Service
1 Gas piping service; 4" Dia; SDR 11; 40 feet joints with couplings
2 Propane PIG and piping (leased)
3 Propane PIG and piping (owned)

Electric Service
1 Powerline extension; underground
2 Powerline extension; underground (premium)
3 Powerline extension; underground; transformer Water
1 Not Used
2 PVC, class 160; SDR-26; 2" dia; excav; backfill; compaction
3 PVC, class 160; SDR-26; 3" dia; excav; backfill; compaction Well
1 Not Used
2 Well; 4" to 6" dia; 100 feet
3 Well; 4" to 6" dia; 150 feet
4 Well; 4" to 6" dia; 200 feet
5 Well; 4" to 6" dia; 300 feet Well Pressure Tank
1 ¾ HP pump in well; submersible; pressure tank; piping; 15' lateral
2 1 HP pump in well; submersible; pressure tank; piping; 15' lateral Sanitary
1 Not Used
2 PVC, SDR-35; bell & spigot; 8" dia; excav; backfill; compaction Septic System
1 Not Used
2 Septic Holding Tank Only; Concrete; 2,000 gal; No distribution boxes or leaching field
3 Septic system; small (3 BR); settlement tank; distr. boxes; leaching field
4 Septic system; average (4-5 BR); settlement tank; distr. boxes; leaching field
5 Septic system; large (5 BR+); settlement tank; distr. boxes; leaching field
6 Engineered septic system; non-percolating soil; settlement tank; distr. boxes; leaching field The above component options further define the construction attributes associated with the assemblies of construction inputted in the preceding step, leading to the capability to dynamically model a construction estimate at a detailed level, including at a room level for special spaces.

The residential construction estimating process of the present invention further includes the step of dynamically calculating an annual energy cost estimate for the residence based on the virtual geometry and thermal properties of component options selected, such as: R-values of various components, building envelope tightness (air infiltration typical of the type of construction selected), energy efficiencies of mechanical system equipment including furnaces, boilers and air conditioning units, fuel type, as well as the geographic location of the proposed residence. The energy consumption model may be used to determine the impact of thermal efficiencies of construction assemblies, envelope tightness and efficiencies of mechanical systems equipment on the residence's energy consumption and resulting energy cost. Major components of the energy cost estimating model include:

Building Envelope Heat Loss: Heat loss in BTU's per Hour (BTUH) is calculated for each of the following components based on the component's area (SF), R-Value, U Factor, and calculated Delta T (difference between the indoor design temperature and the outside design dry bulb temperature).

a) Heat Loss—Basement Walls
b) Heat Loss—Basement Floor (or Ground Floor Slab)
c) Heat Loss—Walkout Wall
d) Heat Loss—Walls
e) Heat Loss—Windows (low-E) Default (R-3)
f) Heat Loss—Windows Standard Glazing (R-2)
g) Heat Loss—Windows (low-E) Triple Glaze (R-6)
h) Heat Loss—Doorwalls
i) Heat Loss—Doors
j) Heat Loss—Roof SIP (on Timber)
k) Heat Loss—Roof SIP (on SIP)
l) Heat Loss—Attic (Uninsulated Roof Rafters)
m) Heat Loss—Skylights Infiltration and Mechanical Ventilation Heat Loss: Heat loss (BTUH) due to air infiltration and required mechanical ventilation is calculated based on the tightness of the building envelope's construction and its ability to resist air infiltration measured in infiltrating Air Changes per Hour (ACH), the resulting Cubic Feet per Minute (CFM) of air infiltration, the volume of the residence, a formula constant and the Delta T (difference between the indoor design temperature and the outside design dry bulb temperature). For ACH below 0.35, additional loss due to a required mechanical air-to-air heat exchanger is incorporated into the heat loss calculation.

a) Standard Stick Built 1.75 ACH
b) Tight Stick Built 1.00 ACH
c) Energy Star™ Minimum 0.35 ACH
d) Energy Star™ Very Tight 0.25 ACH Energy Consumption Calculation: The energy consumption of the residence is calculated based on the BTUH required, the Annual Fuel Usage Efficiency (AFUE) rating of the furnace, Delta T (difference between the indoor design temperature and the outside design dry bulb temperature), correction factor that includes the effects of rated full load efficiency, part load performance, over sizing and energy conservation devices, additional empirical correction factor for heating effect versus 65 degrees F. degrees-days, the heating degree days for the geographic location of the residence and the energy fuel value of the heating fuel used.

Heating Energy Cost Calculation: The annual energy cost for heating is calculated based on the Energy Consumption Calculation and the appropriate fuel cost:

a) Cost per THERM (Natural Gas)
b) Cost per GALLON (Propane)
c) Cost per KWH (Electricity-Assumes Average Off Peak and Peak).

Alternatively, a cooling load and resulting energy cost can be determined for the residence, similar to calculating the heating energy cost for warmer climates where air conditioning is the primary mode of environmental control.

A further significant aspect of the residential construction estimation process of the present invention includes outputting information that is capable of use as a controlling specification section (Control Document) in an overall residential guide specification system. The overall residential specification system consists of detailed guide specifications covering all 16 relevant Construction Specification Institute (CSI) trade divisions;

Division 1 —General Requirements
Division 2—Site Construction
Division 3—Concrete
Division 4—Masonry
Division 5—Metals
Division 6—Wood And Plastics
Division 7—Thermal And Moisture Protection Division 8—Doors And Windows
Division 9—Finishes
Division 10—Specialties
Division 11—Equipment
Division 12—Furnishings
Division 13—Special Construction
Division 14—Conveying Systems
Division 15—Mechanical
Division 16—Electrical The overall residential guide specification system provides specification coverage for site, structural, architectural, mechanical, electrical and plumbing systems.

The detailed component options selected from the residential cost estimation process for each assembly of construction are used in the guide specification as the Control Document, and provides the Owner and Contractor with outline construction descriptions of the building systems as selected by the Owner describing the intended quality of material and installation to be provided by the Contractor, to be further augmented by the detailed descriptions provided in the overall residential guide specification. The Control Document serves a purpose similar to site and engineering drawings, in that scope and construction requirements are identified for site, structural, mechanical, electrical and plumbing systems within the Control Document. The Control Document also controls which material options are to be selected in cases where material options exist in residential guide specification Division sections.

Figure 7:
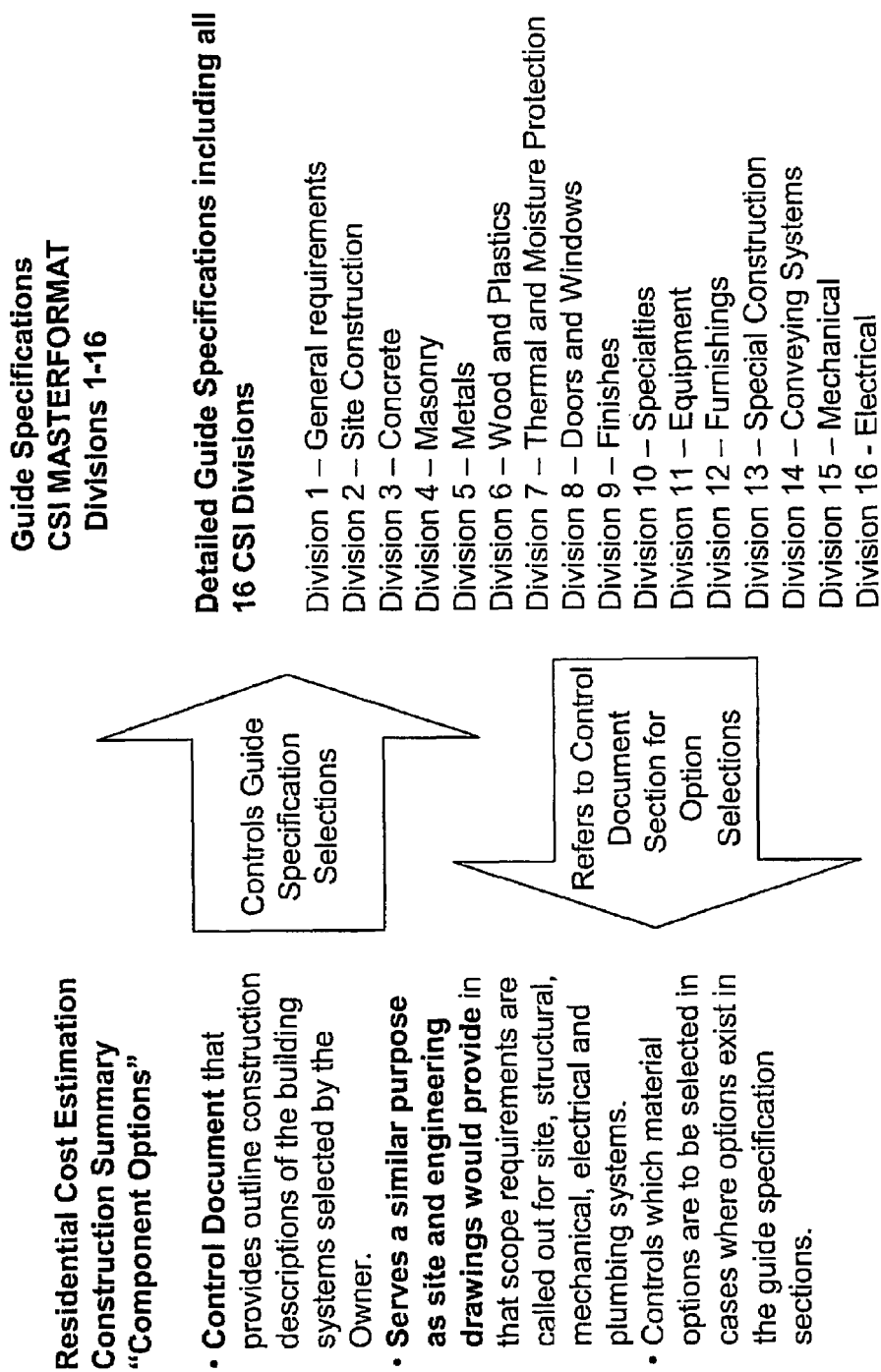
FIG. 7 details the relationship between the Specification Control Document (output from the residential estimation process) and the overall residential guide specification system.

A diagram of the relationship between the Control Document (output from the residential estimation process) and the overall residential guide specification system is seen in FIG. 7.

In the process of the present invention, the various costs of a residence are calculated based upon a total finished area of the residence and the total constructed area of the residence. As an element of the selected and inputted characteristics, a user may specify various portions of the residence as unfinished, to determine the cost affect of various finished levels on different portions of the residence. Trim, cabinetry, and countertop quality and quantity of a residence can also be individually selected at a room-by-room level to determine its affect on the cost of the residence.

The step of inputting various factors required in the computer model that are geographically dependent is preferably automated by inputting the postal Zip Code of the residence's location into project criteria 30. Based on the Zip Code, all required factors are selected from geographic factors database 70 and input into their respective formulas. Such geographically dependent factors include:
1) City and State
2) Construction Market Adjustment Factor
   a) Labor/material adjustment factor
   b) Sales tax rate
   c) Sub-contractor general conditions
   d) Escalation
3) Outside Design Dry Bulb Temperature
4) Annual Heating Degree Days (based on 65 degrees F.)
5) Outside Cooling Design Temperature
6) Annual Cooling Degree Days In a preferred aspect of the present invention, the process is capable of modeling alternative building selections and resulting costs from a baseline set of selections, based on original inputted and selected information and an alternate construction cost reflecting information that has been altered or changed and then compared to the original inputted and selected information. Such an ability of the process provides real-time cost feedback on changing criteria and allows a user to easily compare options and evaluate them as to the affect on the overall cost of a residence. In a preferred aspect, the computer self documents the altered selection as well as the cost impact of the changes as they are made. In this manner, a side by side comparison of various selected options and the affect on the overall cost can be made in an effort to define, evaluate, model and change the home's various design characteristics, construction components and quality levels of those components to meet a predetermined target budget.

Many modifications and variations of the present invention are possible in light of the above teachings. It is therefore, to be understood that within the scope of the appended claims, the invention may be practiced other than as specifically described.

What is claimed:

1. A parametric based residential construction cost estimation process not requiring home floor plans or elevations comprising the steps of:

inputting residential project criteria wherein the project criteria includes project name, location, budget, contacting method, and number of bedrooms and bathrooms;

selecting residential design characteristics wherein the residential design characteristics includes site characteristics and home characteristics;

calculating of simulated parameters without calculating quantities from a generated home floor plan or elevations and based solely on the selected residential design characteristics and inputted residential project criteria;

selecting residential assemblies of construction based on the calculated simulated parameters, selected residential design characteristics and inputted residential project criteria;

selecting residential component options based upon the selected residential assemblies of construction, the calculated simulated parameters, selected residential design characteristics and inputted residential project criteria;

calculating a cost of each of the selected residential component options without calculating quantities from a generated home floor plan or elevations and based solely on the inputted residential project criteria and calculations;

calculating a summary construction cost of a residence at a component level, wherein the cost is dynamically linked to each of the inputted and selected options of the preceding steps, whereby the cost of the residence may be dynamically modeled at a detailed component level at any stage of the design development process and a user may obtain isolated cost feedback resulting from an isolated design criteria change allowing the user to modify the inputted and selected options and explore unlimited what-if changes and cost impacts resulting from the modified inputted and selected options.

2. The residential construction estimation process of claim 1 wherein the data comprising inputted and selected information is stored in computer memory and the cost is computer calculated without calculating quantifies from a generated home floor plan or elevations and based solely on the inputted residential project criteria and calculations, the cost capable of being altered such that a new cost is automatically recalculated at a component level based upon the dynamic interaction of the altered information and the step of calculating a cost of the residence.

3. The residential construction estimation process of claim 1 wherein the step of calculating a cost includes a computer interaction with a database of cost for residential assemblies of construction.

4. The residential construction estimation process of claim 3 wherein the database of costs is adjustable and is adjusted to reflect changing labor and material market conditions.

5. The residential construction estimation process of claim 3 wherein the database of costs is adjustable and is adjusted to reflect changing sales tax rates.

6. The residential construction estimation process of claim 3 wherein the database of costs is adjustable and is adjusted to reflect changing sub-contractor general conditions costs.

7. The residential construction estimation process of claim 3 wherein the database of costs is adjustable and is adjusted to reflect escalation for purposes of estimating construction costs at a future construction date.

8. The residential construction estimation process of claim 1 wherein the step of identifying a cost includes a computer interaction with a database of geographically dependent factors.

9. The residential construction estimation process of claim 1 wherein the step of calculating a cost is calculated referencing a total finished area of the residence.

10. The residential construction estimation process of claim 1 wherein the step of calculating a cost is calculated referencing a total constructed area of the residence including finished and unfinished areas.

11. The residential construction estimation process of claim 8 wherein the database of geographically dependent factors is based upon an entered zip code and wherein the geographically dependent factors may be selected from the group consisting of:
city, state, construction Market Adjustment Factor, labor/material adjustment factor, sales tax rate, sub-contractor general conditions, and escalation.

12. The residential construction estimation process of claim 1 wherein the step of calculating a cost is calculated upon the unique combination of components and attributes of the residence.

13. The residential construction estimation process of claim 1 wherein an alternate cost at a component level reflecting altered information, can be dynamically compared to a base line cost at a component level of the originally inputted and selected information, for documenting the impact of altered information on the cost of the residence.

14. The residential construction estimation process of claim 13 wherein an alternate cost at a component level reflecting altered information, will self-document the component level impact of altered information on the cost of the residence.

15. The residential construction estimation process of claim 1 further including the step of inputting information into a data collection tool prior to the step of inputting project criteria.

16. The residential construction estimation process of claim 15 wherein the step of data collection includes compilation of information entered by a user.

17. The residential construction estimation process of claim 15 wherein the step of data collection includes a web-based interface that collects and directly inputs the project criteria.

18. The residential construction estimation process of claim 15 wherein the step of data collection includes a questionnaire with responses inputted into a computer or a prepared paper form.

19. The residential construction estimation process of claim 1 wherein the step of selecting assemblies of construction includes an interaction of logical formulas dependent upon the selected design characteristics for self directing the assemblies of construction components.

20. The residential construction estimation process of claim 1 wherein the step of selecting assemblies of construction includes an interaction of logical formulas dependent upon the selected design characteristics for self-correcting the assemblies of construction components.

21. The residential construction estimation process of claim 1 wherein the step of selecting component options includes an interaction of logical formulas dependent upon the selected system construction components for self-directing the component options.

22. The residential construction estimation process of claim 1 wherein the step of selecting component options includes an interaction of logical formulas dependent upon the selected system construction components for self-correcting the component options.

23. The residential construction estimation process of claim 1 further including the step of dynamically calculating an energy model of the residence.

24. The residential construction estimation process of claim 23 wherein the step of dynamically calculating an energy model of the residence includes the step of calculating Energy Consumption based upon the heat loss per hour, the Annual Fuel Usage Efficiency (AFUE) rating of a furnace, the difference between the indoor design temperature and the outside design dry bulb temperature, a correction factor that includes the effects of rated full load efficiency, part load performance, over sizing and energy conservation devices, an additional empirical correction factor for heating effect versus 65 degrees F days, the heating degree days for the geographic location of the residence and the energy fuel value of the heating fuel used.

25. The residential construction estimation process of claim 24 wherein the step of dynamically calculating an energy model of the residence includes calculating a Heating Energy Cost based on the Energy Consumption Calculation and a fuel cost selected from the group consisting of: cost per Therm, cost per gallon and cost per kilowatt-hour.

26. The residential construction estimation process of claim 24 wherein the step of dynamically calculating an energy model of the residence includes an interaction with a database of geographically dependent factors.

27. The residential construction estimation process of claim 26 wherein the geographically dependent factors comprise Outside Design Dry Bulb Temperature and Annual Heating Degree Days.

28. The residential construction estimation process of claim 26 wherein the geographically dependent factors are selected by Zip Code.

29. The residential construction estimation process of claim 1 further including outputting functionally descriptive material capable of use in a general building specification.

30. A parametric based residential construction cost estimation process not requiring home floor plans or elevations comprising the steps of:
inputting residential project criteria wherein the project criteria includes project name, location, budget, contacting method, and number of bedrooms and bathrooms;

selecting residential design characteristics wherein the residential design characteristics includes site characteristics and home characteristics;

calculating of simulated parameters without calculating quantities from a generated home floor plan or elevations and based solely on the selected residential design characteristics and inputted residential project criteria;

selecting residential assemblies of construction based on the calculated simulated parameters, selected residential design characteristics and inputted residential project criteria;

selecting residential component options based upon the selected residential assemblies of construction, the calculated simulated parameters, selected residential design characteristics and inputted residential project criteria;

calculating a cost of each of the selected residential component options without calculating quantities from a generated home floor plan or elevations and based solely on the inputted residential project criteria and calculations;

calculating a summary construction cost of a residence at a component lever, wherein the inputted and selected data from each of the preceding steps interacts via logical formulas for self-directing and self-correcting the inputted and selected data.

\* \* \* \* \*

UNITED STATES PATENT AND TRADEMARK OFFICE
CERTIFICATE OF CORRECTION

PATENT NO. : 7,389,255 B2
APPLICATION NO. : 10/721921
DATED : June 17, 2008
INVENTOR(S) : Robert Formisano It is certified that error appears in the above-identified patent and that said Letters Patent is hereby corrected as shown below:

Column 44, line 23 replace "contacting" with --contracting--
Column 44, line 61 replace "quantifies" with --quantities--
Column 46, line 65 replace "contacting" with --contracting--
Column 48, line 9 delete "lever" and replace with --level--
Column 17, line 21 replace the numeral "1" with the letter --I--
Column 17, line 23 replace the numeral "1" with the letter --I--
Column 17, line 25 replace the numeral "1" with the letter --I--
Column 17, line 27 replace the numeral "1" with the letter --I--
Column 17, line 39 replace the numeral "1" with the letter --I--
Column 17, line 40 replace the numeral "1" with the letter --I--
Column 17, line 41 replace the numeral "1" with the letter --I--
Column 17, line 42 replace the numeral "1" with the letter --I--
Column 17, line 49 replace the numeral "1" with the letter --I--
Column 17, line 50 replace "3/4'" with --3/4"--
Column 17, line 51 replace the numeral "1" with the letter --I--
Column 19, line 52 replace "2×0" with --2×10--
Column 21, line 48 replace "1×1 0 fir" with --1×10 fir--
Column 24, line 29 replace "4'-0" with --4'-0"--
Column 24, line 31 replace "4'-0" with --4'-0"--
Column 24, line 32 replace "4'-0" with --4'-0"--
Column 24, line 62 replace "2 cts)" with --(2 cts)--
Column 29, line 11 replace "fir" with --flr--
Column 29, line 57 replace "12×12"×3/8"" with --12"×12"×3/8"--
Column 33, line 1 replace "6" with --7--
Column 33, line 3 replace "7" with --8--
Column 33, line 7 replace "9" with --10--
Column 33, line 9 replace "8" with --11--
Column 33, line 11 replace "9" with --12--
Column 33 line 13 replace "10" with --13--
Column 34, line 10 replace "1100 MBH" with --100 MBH--
Column 36, line 25 replace "(Cat SE)" with --(Cat 5E)--
Column 36, line 26 replace "(Cat SE)" with --(Cat 5E)--
Column 39, line 36 after "bedding" insert --4" cone--
Column 40, line 19 replace the numeral "1" with the letter --I--

UNITED STATES PATENT AND TRADEMARK OFFICE
CERTIFICATE OF CORRECTION

PATENT NO. : 7,389,255 B2  
APPLICATION NO. : 10/721921  
DATED : June 17, 2008  
INVENTOR(S) : Robert Formisano Page 2 of 2

It is certified that error appears in the above-identified patent and that said Letters Patent is hereby corrected as shown below:

Signed and Sealed this

Twenty-third Day of September, 2008

JON W. DUDAS  
*Director of the United States Patent and Trademark Office*